United States Patent
Lee et al.

(10) Patent No.: US 10,663,706 B2
(45) Date of Patent: May 26, 2020

(54) ZOOM OPTICAL SYSTEM

(71) Applicant: Samsung Electro-Mechanics Co., Ltd., Suwon-si (KR)

(72) Inventors: Tae Youn Lee, Suwon-si (KR); Jung Hui Ko, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/502,981

(22) Filed: Jul. 3, 2019

(65) Prior Publication Data

US 2019/0324237 A1 Oct. 24, 2019

Related U.S. Application Data

(63) Continuation of application No. 16/032,676, filed on Jul. 11, 2018, now Pat. No. 10,394,006, which is a
(Continued)

(30) Foreign Application Priority Data

Jan. 26, 2016 (KR) .......................... 10-2016-0009269

(51) Int. Cl.
*G02B 15/14* (2006.01)
*G02B 15/177* (2006.01)
(Continued)

(52) U.S. Cl.
CPC ......... *G02B 15/177* (2013.01); *G02B 13/009* (2013.01); *G02B 5/005* (2013.01);
(Continued)

(58) Field of Classification Search
CPC .... G02B 13/00; G02B 13/009; G02B 15/177; G02B 27/0025; G02B 13/02; G02B 5/005; G02B 5/208
(Continued)

(56) References Cited

U.S. PATENT DOCUMENTS

| 8,456,750 B2 | 6/2013 | Masugi |
| 2005/0286140 A1 | 12/2005 | Tomioka |

(Continued)

FOREIGN PATENT DOCUMENTS

| CN | 102385146 A | 3/2012 |
| CN | 102478706 A | 5/2012 |

(Continued)

OTHER PUBLICATIONS

Korean Office Action issued in counterpart Korean Application No. 10-2016-0009269 dated Jan. 31, 2017 (8 pages in English, 6 pages in Korean).
(Continued)

*Primary Examiner* — William R Alexander
*Assistant Examiner* — Tamara Y. Washington
(74) *Attorney, Agent, or Firm* — NSIP Law

(57) ABSTRACT

A zoom optical system includes a first lens group, a position of which with respect to an imaging plane is adjustable, and including first and second lenses. The zoom optical system also includes a second lens group of which a position with respect to the imaging plane is adjustable and includes third to fifth lenses. The zoom optical system further includes a third lens group including a sixth lens. An object-side surface of the first lens is convex.

19 Claims, 35 Drawing Sheets

Related U.S. Application Data continuation of application No. 15/285,833, filed on Oct. 5, 2016, now Pat. No. 10,048,475.

(51) Int. Cl.
*G02B 13/00* (2006.01)
*G02B 13/02* (2006.01)
*G02B 5/00* (2006.01)
*G02B 5/20* (2006.01)
*G02B 27/00* (2006.01)

(52) U.S. Cl.
CPC ............ *G02B 5/208* (2013.01); *G02B 13/02* (2013.01); *G02B 27/0025* (2013.01)

(58) Field of Classification Search
USPC ......... 359/713, 759, 641, 672–706, 648–650
See application file for complete search history.

(56) References Cited

U.S. PATENT DOCUMENTS

| | | |
|---|---|---|
| 2006/0221463 A1 | 10/2006 | Enomoto |
| 2010/0265362 A1 | 10/2010 | Matsuo |
| 2011/0007405 A1 | 1/2011 | Sakai |
| 2011/0211264 A1 | 9/2011 | Hayakawa |
| 2012/0044577 A1 | 2/2012 | Kato et al. |
| 2012/0050886 A1 | 3/2012 | Masugi |
| 2012/0127589 A1 | 5/2012 | Pao et al. |
| 2013/0027785 A1 | 1/2013 | Kim et al. |
| 2013/0176478 A1 | 7/2013 | Eguchi |
| 2013/0201382 A1 | 8/2013 | Ueda et al. |
| 2013/0314799 A1 | 11/2013 | Kuo |
| 2015/0103412 A1 | 4/2015 | Ori |

FOREIGN PATENT DOCUMENTS

| | | |
|---|---|---|
| CN | 104350409 A | 2/2015 |
| JP | 2010-224263 A | 10/2010 |
| JP | 2011-17848 A | 1/2011 |
| JP | 2012-42811 A | 3/2012 |
| JP | 2013-156625 A | 8/2013 |
| JP | 2013-178493 A | 9/2013 |
| KR | 10-2006-0105512 A | 10/2006 |
| KR | 10-2013-0013514 A | 2/2013 |
| KR | 10-2015-0060398 A | 6/2015 |

OTHER PUBLICATIONS

Chinese Office Action dated Oct. 9, 2018 in corresponding Chinese Patent Application No. 201610971911.8 (9 pages in English and 7 pages in Chinese).

| FIRST EMBODIMENT ||||||
|---|---|---|---|---|---|
| SURFACE NO. | | RADIUS OF CURVATURE | THICKNESS/ DISTANCE | FOCAL LENGTH | REFRACTIVE INDEX (ni) | ABBE NUMBER (vi) |
| S0 | OBJECT | infinity | D0 | | | |
| S1* | FIRST LENS | 18905.590 | 1.330 | -5.790 | 1.531 | 56.510 |
| S2* | | 3.080 | 1.150 | | | |
| S3* | SECOND LENS | 5.230 | 1.160 | 17.720 | 1.636 | 23.900 |
| S4* | | 8.920 | D1 | | | |
| S5 | STOP | infinity | 0.100 | | | |
| S6* | THIRD LENS | 2.710 | 1.200 | 4.900 | 1.535 | 55.710 |
| S7* | | -70.360 | 0.100 | | | |
| S8* | FOURTH LENS | 20.490 | 0.500 | -8.260 | 1.636 | 23.900 |
| S9* | | 4.140 | 0.190 | | | |
| S10* | FIFTH LENS | 6.380 | 0.560 | 33.020 | 1.535 | 55.710 |
| S11* | | 9.700 | D2 | | | |
| S12* | SIXTH LENS | 28.66 | 1.090 | 22.610 | 1.531 | 56.510 |
| S13* | | -20.39 | D3 | | | |
| S14 | FILTER | infinity | 0.110 | | 1.517 | 64.2 |
| S15 | IMAGING PLANE | infinity | 0.700 | | | |

FIG. 6

| FIFTH EMBODIMENT | WIDE-ANGLE POSITION | MIDDLE POSITION | TELEPHOTO POSITION |
| --- | --- | --- | --- |
| f | 3.656 | 7.273 | 17.342 |
| F number | 2.755 | 3.764 | 6.736 |
| TTL | 25.617 | 22.288 | 28.379 |
| D0 | infinity | infinity | infinity |
| D1 | 11.407 | 4.381 | 0.400 |
| D2 | 2.740 | 6.318 | 16.989 |
| D3 | 3.280 | 3.399 | 2.801 |

FIG. 7

| FIRST EMBODIMENT | K | A | B | C | D |
|---|---|---|---|---|---|
| S1 | -98.99999 | -3.6292E-04 | -2.3403E-05 | 5.9935E-07 | -2.8052E-09 |
| S2 | -0.40896 | -1.7793E-03 | 1.2135E-05 | -2.4511E-06 | -1.1100E-06 |
| S3 | -1.45756 | -1.5189E-03 | 1.2374E-04 | -3.1063E-06 | -6.5260E-07 |
| S4 | -10.74323 | -1.2787E-03 | 2.9183E-05 | -7.9515E-06 | 2.6254E-08 |
| S6 | -0.00715 | -6.6090E-04 | 9.4123E-05 | -1.2661E-06 | 5.5468E-06 |
| S7 | 89.56431 | 2.1617E-04 | 5.4610E-04 | 1.2783E-04 | 3.5676E-05 |
| S8 | 95.59711 | 1.1844E-03 | 2.6066E-04 | 2.1033E-04 | 8.3372E-05 |
| S9 | 6.14196 | -1.3231E-03 | 1.3483E-04 | -6.8089E-06 | -4.8292E-05 |
| S10 | 16.17662 | -2.2624E-03 | 3.0715E-04 | 2.9846E-05 | -3.9993E-04 |
| S11 | 20.28605 | 6.7961E-03 | 7.0355E-04 | 1.0552E-04 | -3.5132E-04 |
| S12 | -85.31479 | 2.7623E-03 | -3.4650E-04 | 4.4764E-05 | -2.3068E-06 |
| S13 | -90.96514 | 2.3881E-03 | -4.4429E-04 | 6.0159E-05 | -3.0576E-06 |

FIG. 8

| SECOND EMBODIMENT | | | | | | |
|---|---|---|---|---|---|---|
| SURFACE NO. | | RADIUS OF CURVATURE | THICKNESS/ DISTANCE | FOCAL LENGTH | REFRACTIVE INDEX (ni) | ABBE NUMBER(vi) |
| S0 | OBJECT | infinity | D0 | | | |
| S1* | FIRST LENS | 97.750 | 0.800 | -5.720 | 1.538 | 56.510 |
| S2* | | 2.980 | 1.250 | | | |
| S3* | SECOND LENS | 5.240 | 1.190 | 16.940 | 1.655 | 23.900 |
| S4* | | 9.050 | D1 | | | |
| S5 | STOP | infinity | 0.100 | | | |
| S6* | THIRD LENS | 2.710 | 1.210 | 4.750 | 1.542 | 55.710 |
| S7* | | -42.100 | 0.110 | | | |
| S8* | FOURTH LENS | 30.460 | 0.510 | -7.650 | 1.655 | 23.900 |
| S9* | | 4.270 | 0.210 | | | |
| S10* | FIFTH LENS | 6.780 | 0.630 | 37.490 | 1.542 | 55.710 |
| S11* | | 9.850 | D2 | | | |
| S12* | SIXTH LENS | 13.64 | 1.250 | 23.030 | 1.538 | 56.510 |
| S13* | | -129.73 | 3.140 | | | |
| S14 | FILTER | infinity | 0.110 | | 1.522 | 64.2 |
| S15 | IMAGING PLANE | infinity | 0.517 | | | |

FIG. 14

| SECOND EMBODIMENT | WIDE-ANGLE POSITION | MIDDLE POSITION | TELEPHOTO POSITION |
|---|---|---|---|
| f | 3.645 | 7.344 | 17.337 |
| F number | 2.816 | 3.863 | 6.708 |
| TTL | 25.912 | 22.364 | 28.495 |
| D0 | infinity | infinity | infinity |
| D1 | 11.919 | 4.570 | 0.400 |
| D2 | 2.951 | 6.754 | 17.060 |

FIG. 15

| SECOND EMBODIMENT | K | A | B | C | D |
|---|---|---|---|---|---|
| S1 | -81.31233 | -4.2332E-04 | -2.4079E-05 | 4.6886E-07 | 5.6436E-10 |
| S2 | -0.45500 | -1.9731E-03 | 5.1694E-05 | -2.0975E-06 | -1.2683E-06 |
| S3 | -1.64639 | -1.6183E-03 | 1.4032E-04 | -2.4523E-06 | -5.1586E-07 |
| S4 | -11.89435 | -1.3400E-03 | 4.2160E-05 | -8.0933E-06 | 1.5905E-07 |
| S6 | -0.00251 | -7.1937E-04 | 2.1203E-04 | 1.0496E-05 | 3.3749E-06 |
| S7 | 58.27444 | 1.4192E-04 | 5.6477E-04 | 1.3309E-04 | 2.9188E-05 |
| S8 | 96.20599 | 1.2658E-03 | 2.5766E-04 | 2.0776E-04 | 8.6389E-05 |
| S9 | 6.01993 | -1.4111E-03 | 2.2440E-04 | 5.4211E-05 | -4.3486E-05 |
| S10 | 16.65326 | -2.0510E-03 | 2.6551E-04 | -1.6879E-05 | -4.0841E-04 |
| S11 | 19.90967 | 6.9253E-03 | 3.7829E-04 | 5.2623E-05 | -3.1419E-04 |
| S12 | -30.06460 | 3.0995E-03 | -3.5619E-04 | 4.3244E-05 | -2.1746E-06 |
| S13 | 99.00000 | 2.8439E-03 | -4.8545E-04 | 6.1711E-05 | -3.0963E-06 |

FIG. 16

| THIRD EMBODIMENT | | | | | | |
|---|---|---|---|---|---|---|
| SURFACE NO. | | RADIUS OF CURVATURE | THICKNESS/ DISTANCE | FOCAL LENGTH | REFRACTIVE INDEX (ni) | ABBE NUMBER(vi) |
| S0 | OBJECT | infinity | D0 | | | |
| S1* | FIRST LENS | 70.660 | 0.750 | -5.760 | 1.535 | 55.710 |
| S2* | | 2.940 | 1.250 | | | |
| S3* | SECOND LENS | 5.190 | 1.200 | 17.010 | 1.636 | 23.900 |
| S4* | | 9.100 | D1 | | | |
| S5 | STOP | infinity | 0.100 | | | |
| S6* | THIRD LENS | 2.700 | 1.200 | 4.790 | 1.535 | 55.710 |
| S7* | | -41.420 | 0.110 | | | |
| S8* | FOURTH LENS | 30.550 | 0.520 | -7.860 | 1.636 | 23.900 |
| S9* | | 4.260 | 0.210 | | | |
| S10* | FIFTH LENS | 6.770 | 0.620 | 40.840 | 1.535 | 55.710 |
| S11* | | 9.490 | D2 | | | |
| S12* | SIXTH LENS | 11.31 | 1.170 | 23.290 | 1.531 | 56.510 |
| S13* | | 127.04 | D3 | | | |
| S14 | FILTER | infinity | 0.110 | | 1.517 | 64.2 |
| S15 | IMAGING PLANE | infinity | 0.540 | | | |

FIG. 22

| THIRD EMBODIMENT | WIDE-ANGLE POSITION | MIDDLE POSITION | TELEPHOTO POSITION |
|---|---|---|---|
| f | 3.655 | 7.357 | 17.341 |
| F number | 2.855 | 3.910 | 6.785 |
| TTL | 26.012 | 22.355 | 28.517 |
| D0 | infinity | infinity | infinity |
| D1 | 12.060 | 4.614 | 0.400 |
| D2 | 3.125 | 6.844 | 17.084 |
| D3 | 3.052 | 3.121 | 3.258 |

FIG. 23

| THIRD EMBODIMENT | K | A | B | C | D |
|---|---|---|---|---|---|
| S1 | -26.58356 | -4.1718E-04 | -2.4079E-05 | 3.8908E-07 | 2.1522E-09 |
| S2 | -0.46954 | -2.0273E-03 | 6.2585E-05 | -2.3751E-06 | -1.3286E-06 |
| S3 | -1.68453 | -1.6333E-03 | 1.4128E-04 | -2.6538E-06 | -5.3222E-07 |
| S4 | -12.05845 | -1.3804E-03 | 4.1586E-05 | -8.8636E-06 | 2.0293E-07 |
| S6 | -0.00232 | -7.4610E-04 | 2.3353E-04 | 1.1779E-05 | 1.7665E-06 |
| S7 | 52.09751 | 1.5327E-04 | 5.7649E-04 | 1.3056E-04 | 2.6775E-05 |
| S8 | 99.00000 | 1.2991E-03 | 2.5074E-04 | 2.0815E-04 | 8.6069E-05 |
| S9 | 6.02300 | -1.4960E-03 | 2.6774E-04 | 6.0694E-05 | -4.7618E-05 |
| S10 | 16.62920 | -2.0174E-03 | 2.1529E-04 | -2.6591E-05 | -4.0783E-04 |
| S11 | 19.55899 | 6.8854E-03 | 2.9751E-04 | 2.7724E-05 | -3.1421E-04 |
| S12 | -19.21959 | 3.3121E-03 | -3.5778E-04 | 4.3320E-05 | -2.0893E-06 |
| S13 | 99.00000 | 2.8801E-03 | -4.8998E-04 | 6.2772E-05 | -3.0736E-06 |

FIG. 24

| FOURTH EMBODIMENT | | | | | | |
|---|---|---|---|---|---|---|
| SURFACE NO. | | RADIUS OF CURVATURE | THICKNESS/ DISTANCE | FOCAL LENGTH | REFRACTIVE INDEX (ni) | ABBE NUMBER (vi) |
| S0 | OBJECT | infinity | D0 | | | |
| S1* | FIRST LENS | 75.250 | 1.200 | -5.940 | 1.544 | 56.090 |
| S2* | | 3.080 | 1.400 | | | |
| S3* | SECOND LENS | 5.610 | 1.040 | 19.840 | 1.650 | 21.520 |
| S4* | | 9.200 | D1 | | | |
| S5 | STOP | infinity | 0.100 | | | |
| S6* | THIRD LENS | 2.710 | 1.140 | 4.890 | 1.535 | 55.710 |
| S7* | | -65.740 | 0.100 | | | |
| S8* | FOURTH LENS | 20.190 | 0.570 | -8.860 | 1.650 | 21.520 |
| S9* | | 4.430 | 0.190 | | | |
| S10* | FIFTH LENS | 7.150 | 0.630 | 56.500 | 1.535 | 55.710 |
| S11* | | 9.070 | D2 | | | |
| S12* | SIXTH LENS | 19.08 | 1.090 | 22.710 | 1.531 | 56.510 |
| S13* | | -32.15 | D3 | | | |
| S14 | FILTER | infinity | 0.110 | | 1.517 | 64.2 |
| S15 | IMAGING PLANE | infinity | 0.500 | | | |

FIG. 30

| FOURTH EMBODIMENT | WIDE-ANGLE POSITION | MIDDLE POSITION | TELEPHOTO POSITION |
|---|---|---|---|
| f | 3.655 | 7.356 | 17.339 |
| F number | 2.885 | 3.968 | 6.889 |
| TTL | 25.775 | 22.341 | 28.503 |
| D0 | infinity | infinity | infinity |
| D1 | 11.489 | 4.266 | 0.400 |
| D2 | 2.870 | 6.442 | 17.343 |
| D3 | 3.359 | 3.575 | 2.702 |

FIG. 31

| FOURTH EMBODIMENT | K | A | B | C | D |
|---|---|---|---|---|---|
| S1  | -61.62384 | -7.5765E-04 | 4.7608E-05  | -3.3481E-06 | 6.4787E-08  |
| S2  | -0.44181  | -3.0797E-03 | 3.9700E-04  | -3.4215E-05 | -3.6023E-07 |
| S3  | -1.92906  | -2.8096E-03 | 5.0300E-04  | -5.2503E-05 | 1.4593E-06  |
| S4  | -13.65829 | -2.0268E-03 | 3.1087E-04  | -4.9255E-05 | 2.0678E-06  |
| S6  | -0.01534  | -1.3190E-03 | 5.9011E-04  | -1.1782E-04 | 1.6840E-05  |
| S7  | -10.57856 | -5.3760E-05 | 8.7943E-04  | 6.7516E-05  | 2.9679E-05  |
| S8  | 87.93347  | 1.5343E-03  | -4.1451E-04 | 5.8428E-04  | 6.5719E-06  |
| S9  | 6.09262   | -2.2216E-03 | 2.1697E-03  | -1.3226E-03 | 3.6399E-04  |
| S10 | 16.44561  | -3.4873E-03 | 3.6911E-03  | -2.8866E-03 | 3.3254E-04  |
| S11 | 18.66857  | 6.9841E-03  | 1.1579E-03  | -1.1132E-03 | -2.0490E-05 |
| S12 | -27.27192 | 3.1776E-03  | -6.6773E-04 | 8.4005E-05  | -4.2782E-06 |
| S13 | -65.30723 | 3.7002E-03  | -8.5399E-04 | 9.9482E-05  | -4.7610E-06 |

FIG. 32

| FIFTH EMBODIMENT | | | | | | |
|---|---|---|---|---|---|---|
| SURFACE NO. | | RADIUS OF CURVATURE | THICKNESS/ DISTANCE | FOCAL LENGTH | REFRACTIVE INDEX (ni) | ABBE NUMBER(vi) |
| S0 | OBJECT | infinity | D0 | | | |
| S1* | FIRST LENS | -86.890 | 1.630 | -5.180 | 1.531 | 56.510 |
| S2* | | 2.860 | 1.460 | | | |
| S3* | SECOND LENS | 4.650 | 1.540 | 15.090 | 1.636 | 23.900 |
| S4* | | 7.860 | D1 | | | |
| S5 | STOP | infinity | 0.100 | | | |
| S6* | THIRD LENS | 2.700 | 1.320 | 4.870 | 1.535 | 55.710 |
| S7* | | -64.030 | 0.120 | | | |
| S8* | FOURTH LENS | 30.970 | 0.300 | -7.840 | 1.636 | 23.900 |
| S9* | | 4.280 | 0.210 | | | |
| S10* | FIFTH LENS | 6.660 | 0.450 | 39.110 | 1.535 | 55.710 |
| S11* | | 9.540 | D2 | | | |
| S12* | SIXTH LENS | 9.41 | 1.370 | 17.060 | 1.531 | 56.510 |
| S13* | | -234.48 | D3 | | | |
| S14 | FILTER | infinity | 0.110 | | 1.517 | 64.2 |
| S15 | IMAGING PLANE | infinity | 0.200 | | | |

FIG. 38

| FIFTH EMBODIMENT | WIDE-ANGLE POSITION | MIDDLE POSITION | TELEPHOTO POSITION |
|---|---|---|---|
| f | 3.036 | 6.071 | 18.190 |
| F number | 2.552 | 3.417 | 7.362 |
| TTL | 29.585 | 25.107 | 34.923 |
| D0 | infinity | infinity | infinity |
| D1 | 14.022 | 5.819 | 0.700 |
| D2 | 3.922 | 7.324 | 22.693 |
| D3 | 2.832 | 3.156 | 2.721 |

FIG. 39

| FIFTH EMBODIMENT | K | A | B | C | D |
|---|---|---|---|---|---|
| S1 | 2.15788 | 1.0246E-04 | -1.6782E-05 | 4.5733E-07 | -4.9677E-09 |
| S2 | -0.60127 | -2.7883E-03 | 1.7038E-04 | 1.0980E-06 | -6.9967E-07 |
| S3 | -1.48679 | -1.4837E-03 | 2.0157E-04 | 1.0767E-06 | -3.9158E-07 |
| S4 | -7.05592 | -6.9029E-04 | 1.1926E-04 | -4.2675E-06 | -1.1146E-07 |
| S6 | 0.03422 | -6.1798E-04 | 1.6885E-04 | -1.0877E-06 | 6.8477E-06 |
| S7 | -99.00000 | 1.1214E-04 | 5.8978E-04 | 1.1621E-04 | 1.8917E-05 |
| S8 | 99.00000 | 2.0075E-03 | 3.5265E-04 | 2.1367E-04 | 8.3825E-05 |
| S9 | 6.07290 | -2.8079E-03 | -9.2166E-05 | 2.7530E-06 | -2.5560E-05 |
| S10 | 16.28086 | -2.3803E-03 | 2.2682E-04 | -2.1280E-05 | -3.8994E-04 |
| S11 | 23.97098 | 7.9815E-03 | 6.2687E-04 | 1.6494E-04 | -3.6119E-04 |
| S12 | -9.87822 | 4.2075E-03 | -3.5382E-04 | 3.5063E-05 | -1.2971E-06 |
| S13 | -99.00000 | 5.3138E-03 | -6.2448E-04 | 6.3251E-05 | -2.5101E-06 |

FIG. 40

ZOOM OPTICAL SYSTEM

CROSS-REFERENCE TO RELATED APPLICATIONS

This application is a Continuation Application of U.S. patent application Ser. No. 16/032,676 filed on Jul. 11, 2018, which is a Continuation Application of U.S. patent application Ser. No. 15/285,833 filed on Oct. 5, 2016, now U.S. Pat. No. 10,048,475, issued on Aug. 14, 2018, which claims benefit under 35 USC 119(a) of Korean Patent Application No. 10-2016-0009269 filed on Jan. 26, 2016, in the Korean Intellectual Property Office, the entire disclosures of which are incorporated herein by reference for all purposes.

BACKGROUND

1. Field

The following description relates to a zoom optical system to adjust a focal length.

2. Description of Related Art

A zoom optical system has an adjustable focal length. For example, the focal length of a zoom optical system is adjusted so as to clearly capture an image of an object at a long distance or an object at a short distance. Such a zoom optical system commonly includes lenses made of glass to decrease chromatic aberrations.

Over time, a camera module including the zoom optical system has been gradually miniaturized in size over the years. Therefore, miniaturization of the zoom optical system has also been required. However, because manufacturing costs of zoom optical systems containing lenses made of glass are relatively high and it is difficult to produce zoom optical systems that are light weight, it is difficult to apply zoom optical systems containing lenses made of glass to a small camera. Therefore, the development of a lightened zoom optical system able to be mounted in a small camera module is needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a zoom optical system, including: a first lens group including a negative refractive power; a second lens group including a positive refractive power; and a third lens group including a positive refractive power, wherein the first to third lens groups are sequentially disposed from an object side toward an imaging plane, upon zooming from a wide-angle position to a telephoto position, a gap between the first and second lens groups may be decreased, a gap between the second and third lens groups may be adjustable, the first lens group may include a first lens and a second lens, the second lens group may include a third lens, a fourth lens, and a fifth lens, and the third group may include a sixth lens, and $1.9 \leq |fG1/fw| \leq 3.0$, $4.0 < ft/fw < 7.0$, and $1.61 < n4 < 1.68$, where fw may be an overall focal length of the zoom optical system in the wide-angle position, fG1 may be a synthesized focal length of the first lens group, ft may be an overall focal length of the zoom optical system in the telephoto position, and n4 may be a refractive index of the fourth lens.

The first lens may include a negative refractive power and may be made of plastic, and one surface thereof may be aspherical, and the second lens may include a positive refractive power, having a meniscus shape, and made of plastic.

The third lens may include a positive refractive power, may be made of plastic, and an object-side surface thereof may be convex; the fourth lens may be made of plastic, and the fifth lens may be made of plastic.

The sixth lens may include a positive refractive power and may be made of plastic.

The zoom optical system may also include a stop disposed between the first and second lens groups.

An image-side surface of the first lens may be concave and an object-side surface of the first lens may be one of convex and concave.

The first to sixth lenses have an aspherical shape.

$1.51 < n3 < 1.57$, where n3 may be a refractive index of the third lens.

$0.7 < |fG2/fG1| < 1.2$, where fG1 may be the synthesized focal length of the first lens group, and fG2 may be a synthesized focal length of the second lens group.

$1.4 < fG2/fw < 2.8$, where fG2 may be a synthesized focal length of the second lens group, and fw may be the overall focal length of the zoom optical system in the wide-angle position.

$TG1+TG2+TG3 < 8.5$, where TG1 may be a distance from an object-side surface of the first lens to an image-side surface of the second lens, TG2 may be a distance from an object-side surface of the third lens to an image-side surface of the fifth lens, TG3 may be a thickness of the sixth lens at a center of an optical axis.

$0.25 < 1-MG3T^2 < 0.6$, where MG3T may be an imaging magnification of the third lens group positioned in the telephoto position at infinity.

$4.0 < MG2T/MG2W < 6.8$, where MG2T may be an imaging magnification of the second lens group positioned in the telephoto position at infinity, and MG2W may be an imaging magnification of the second lens group positioned in the wide-angle position at infinity.

$50 < V1 < 60$, where V1 may be an Abbe number of the first lens.

$30 < V1-V2 < 37$, where V1 may be an Abbe number of the first lens and V2 may be an Abbe number of the second lens.

$n1+n2 < 3.25$, where n1 may be a refractive index of the first lens and n2 may be a refractive index of the second lens.

$0 < n4-n1 < 0.2$, where n1 may be a refractive index of the first lens and n4 may be the refractive index of the fourth lens.

$2.2 < fw/EPDw < 3.0$, where fw may be the overall focal length of the zoom optical system in the wide-angle position and EPDw may be an entrance pupil diameter in the wide-angle position.

In accordance with a further embodiment, there is provided a zoom optical system, including: a first lens including a negative refractive power; a second lens including a positive refractive power; a third lens including a positive refractive power; a fourth lens including a negative refractive power; a fifth lens including a positive refractive power; and a sixth lens including a positive refractive power and an object-side surface thereof being convex, wherein the first to sixth lenses are sequentially disposed from an object side toward an imaging plane, and positions of the first to fifth lenses with respect to the imaging plane are adjustable.

An image-side surface of the first lens may be concave and an object-side surface of the first lens may be one of convex and concave, an image-side surface of the second lens may be convex and an object-side surface of the second lens may be concave, an image-side surface of the third lens may be convex and an object-side surface of the third lens may be convex, an image-side surface of the fourth lens may be convex and an object-side surface of the fourth lens may be concave, an image-side surface of the fifth lens may be convex and an object-side surface of the fifth lens may be concave, and an image-side surface of the sixth lens may be convex.

Other features and aspects will be apparent from the following detailed description, the drawings, and the claims.

BRIEF DESCRIPTION OF DRAWINGS

FIG. 6 is a table representing respective characteristics of lenses of the zoom optical system illustrated in FIG. 1;

FIG. 7 is a table representing optical characteristics and distances (D1, D2, and D3) between lens groups depending on the wide-angle position, the middle position, and the telephoto position;

FIG. 8 is a table representing aspherical characteristics of the zoom optical system illustrated in FIG. 1;

FIG. 14 is a table representing respective characteristics of lenses of the zoom optical system illustrated in FIG. 9;

FIG. 15 is a table representing optical characteristics and distances (D1, D2, and D3) between lens groups depending on the wide-angle position, the middle position, and the telephoto position;

FIG. 16 is a table representing aspherical characteristics of the zoom optical system illustrated in FIG. 9;

FIG. 22 is a table representing respective characteristics of lenses of the zoom optical system illustrated in FIG. 17;

FIG. 23 is a table representing optical characteristics and distances (D1, D2, and D3) between lens groups depending on the wide-angle position, the middle position, and the telephoto position;

FIG. 24 is a table representing aspherical characteristics of the zoom optical system illustrated in FIG. 17;

FIG. 30 is a table representing respective characteristics of lenses of the zoom optical system illustrated in FIG. 25;

FIG. 31 is a table representing optical characteristics and distances (D1, D2, and D3) between lens groups depending on the wide-angle position, the middle position, and the telephoto position;

FIG. 32 is a table representing aspherical characteristics of the zoom optical system illustrated in FIG. 25;

FIG. 38 is a table representing respective characteristics of lenses of the zoom optical system illustrated in FIG. 33;

FIG. 39 is a table representing optical characteristics and distances (D1, D2, and D3) between lens groups depending on the wide-angle position, the middle position, and the telephoto position; and FIG. 40 is a table representing aspherical characteristics of the zoom optical system illustrated in FIG. 33.

Figure 1:
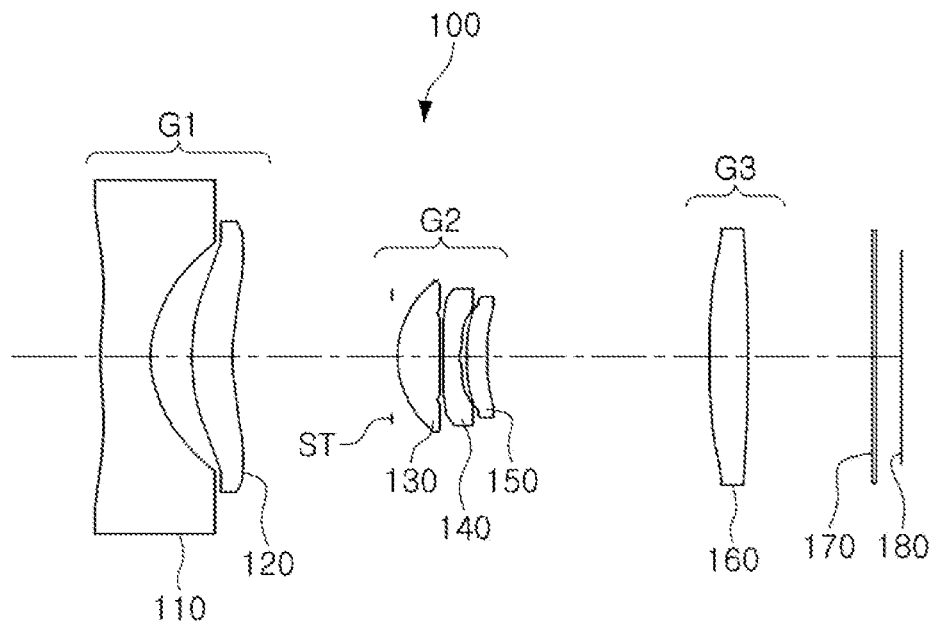
FIG. 1 is a configuration diagram of a zoom optical system, according to a first embodiment, in a middle position.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, third, etc. may be used herein to describe various lenses, these lenses should not be limited by these terms. These terms are only used to distinguish one lens from another lens. These terms do not necessarily imply a specific order or arrangement of the lenses. Thus, a first lens discussed below could be termed a second lens without departing from the teachings description of the various embodiments.

Example embodiments of the present disclosure will now be described in detail with reference to the accompanying drawings.

In addition, a surface of each lens closest to an object is referred to as a first surface or an object-side surface, and a surface of each lens closest to an imaging surface is referred to as a second surface or an image-side surface. Further, all numerical values of radii of curvature, thicknesses/distances, TTLs, Y (½ of a diagonal length of the imaging plane), and focal lengths, and other parameters of the lenses are represented in millimeters (mm).

A person skilled in the relevant art will appreciate that other units of measurement may be used. Further, in the present specification, all radii of curvature, thicknesses, OALs (optical axis distances from the first surface of the first lens to the image sensor (OALs), a distance on the optical axis between the stop and the image sensor (SLs), image heights (IMGHs) (image heights), and black focus lengths (BFLs) (back focus lengths) of the lenses, an overall focal length of an optical system, and a focal length of each lens are indicated in millimeters (mm). Further, thicknesses of lenses, gaps between the lenses, OALs, and SLs are distances measured based on an optical axis of the lenses.

In addition, in an embodiment, shapes of lenses are described and illustrated in relation to optical axis portions of the lenses.

A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

In addition, in an embodiment, thicknesses and radii of curvatures of lenses are measured in relation to optical axes of the corresponding lenses.

An optical system, according to an embodiment, includes six lenses. As an example, the optical system may include a first lens, a second lens, a third lens, a fourth lens, a fifth lens, and a sixth lens. The lens module may include from four lenses up to six lenses without departing from the scope of the embodiments herein described. In accordance with an illustrative example, the embodiments described of the optical system include six lenses with a refractive power. However, a person of ordinary skill in the relevant art will appreciate that the number of lenses in the optical system may vary, for example, between two to six lenses, while achieving the various results and benefits described hereinbelow. Also, although each lens is described with a particular refractive power, a different refractive power for at least one of the lenses may be used to achieve the intended result.

In the optical system, according to embodiments, the first to sixth lenses are made of materials including glass, plastic or other similar types of polycarbonate materials. In another embodiment, at least one of the first through sixth lenses is formed of a material different from the materials forming the other first through sixth lenses.

In addition, in the present specification, a first lens refers to a lens closest to an object (or a subject), while a sixth lens refers to a lens closest to an imaging plane (or an image sensor). Further, the thicknesses of the lenses, gaps between the lenses, and the TTL are distances on an optical axis of the lenses. A zoom optical system includes a plurality of lens groups. For example, the zoom optical system includes a first lens group, a second lens group, and a third lens group. The first lens group, the second lens group, and the third lens group are sequentially disposed from the object side toward the imaging plane.

The first lens group includes a plurality of lenses. For example, the first lens group includes a first lens having a negative refractive power and a second lens having a positive refractive power. The first lens group including such first lens and second lens, has an overall negative refractive power. The first lens group includes a lens made of plastic. For example, both the first and second lenses configuring the first lens group are made of plastic. The first lens group may include an aspherical lens. For example, both the first and second lenses configuring the first lens group have an aspherical shape. The first lens group is configured so that a position thereof with respect to the imaging plane is adjustable. In one example, the first lens group is positioned to be closest to the imaging plane in a middle position and to be farthest from the imaging plane in a telephoto position.

The second lens group includes a plurality of lenses. For example, the second lens group includes a third lens having a positive refractive power, a fourth lens having a negative refractive power, and a fifth lens having a positive refractive power. The second lens group including the third lens, the fourth lens, and the fifth lens have an overall positive refractive power. The second lens group includes a lens made of plastic. For example, the third lens, the fourth lens, and the fifth lens configuring the second lens group are made of plastic. The second lens group includes an aspherical lens. For example, all of the third to fifth lenses configuring the second lens group have an aspherical shape. The second lens group is configured so that a position thereof with respect to the imaging plane is adjustable. For example, the second lens group is positioned to be closest to the imaging plane in a wide-angle position and to be farthest from the imaging plane in the telephoto position.

The third lens group includes one or more lenses. For example, the third lens group includes a sixth lens having a positive refractive power. The third lens group including the sixth lens has an overall positive refractive power. The third lens group may include a lens made of plastic. For example, the sixth lens configuring the third lens group is made of plastic. The third lens group includes an aspherical lens. For example, the sixth lens configuring the third lens group has an aspherical shape. The third lens group is configured so that a position thereof with respect to the imaging plane is adjustable. For example, the third lens group is positioned to be closest to the imaging plane in the telephoto position and to be farthest from the imaging plane in the middle position. However, a distance between the third lens group and the imaging plane is not always changed. In one example, a distance between the third lens group and the imaging plane is constantly maintained regardless of the wide-angle position, the middle position, and the telephoto position.

At least one of the lenses configuring each of the lens groups may have aspherical shape as described above. In an example, the aspherical surfaces of the lenses may be represented by Equation 1.

$$Z = \frac{cr^2}{1 + \sqrt{1-(1+k)c^2r^2}} + Ar^4 + Br^6 + Cr^8 + Dr^{10} + Er^{12} + Fr^{14} + Gr^{16} + Hr^{18} + Ir^{20} \quad \text{[Equation 1]}$$

In Equation 1, c is an inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance r and a tangential plane meeting the apex of the aspherical surface of the lens.

The zoom optical system includes a stop. The stop may be disposed between the first and second lens groups.

The zoom optical system includes a filter. The filter may partially block wavelengths of incident light incident through the first to third lens groups. For example, the filter blocks an infrared wavelength of the incident light. The filter may be manufactured to have a reduced thickness. To this end, the filter may be made of plastic.

The zoom optical system includes an image sensor. The image sensor provides the imaging plane on which light refracted by the lenses is imaged. For example, a surface of the image sensor forms the imaging plane. The image sensor is configured to realize high resolution images. For example, a unit size of the pixels configuring the image sensor may be 1.12 μm or less.

The zoom optical system may satisfy the following Conditional Expressions:

$1.9 \leq |fG1/fw| \leq 3.0$      [Conditional Expression 1]

$4.0 < ft/fw < 7.0$      [Conditional Expression 2]

$1.61 < n4 < 1.68$      [Conditional Expression 3]

$0.7 < |fG2/fG1| < 1.2$      [Conditional Expression 4]

$1.4 < fG2/fw < 2.8$      [Conditional Expression 5]

$TG1+TG2+TG3 < 8.5$      [Conditional Expression 6]

$0.25 < 1-MG3T^2 < 0.6$      [Conditional Expression 7]

$4.0 < MG2T/MG2W < 6.8$      [Conditional Expression 8]

$50 < V1 < 60$      [Conditional Expression 9]

$30 < V1-V2 < 37$      [Conditional Expression 10]

$1.51 < n3 < 1.57$      [Conditional Expression 11]

$n1+n2 < 3.25$      [Conditional Expression 12]

$0 < n4-n1 < 0.2$      [Conditional Expression 13]

$2.2 < fw/EPDw < 3.0$.      [Conditional Expression 14]

In an embodiment, fw is an overall focal length of the zoom optical system in the wide-angle position, ft is an overall focal length of the zoom optical system in the telephoto position, fG1 is a synthesized focal length of the first lens group, fG2 is a synthesized focal length of the second lens group, n1 is a refractive index of the first lens, n2 is a refractive index of the second lens, n3 is a refractive index of the third lens, n4 is a refractive index of the fourth lens, TG1 is a distance from an object-side surface of the first lens to an image-side surface of the second lens, TG2 is a distance from an object-side surface of the third lens to an image-side surface of the fifth lens, TG3 is a thickness of the sixth lens at the center of an optical axis, MG2T is an imaging magnification of the second lens group positioned in the telephoto position at infinity, MG2W is an imaging magnification of the second lens group positioned in the wide-angle position at infinity, MG3T is an imaging magnification of the third lens group positioned in the telephoto position at infinity, V1 is an Abbe number of the first lens, V2 is an Abbe number of the second lens, and EPDw is an entrance pupil diameter in the wide-angle position.

Among the Conditional Expressions described above, Conditional Expression 1 is a condition that limits a magnitude of refractive power of the first lens group. For example, a first lens group exceeding the lower limit of Conditional Expression 1 may have strong refractive power making it difficult to correct field curvature aberration in the wide-angle position, spherical aberration in the telephoto position, and coma aberration. Further, in cases of lenses of the first lens group exceeding the lower limit of Conditional Expression 1, it may be difficult to mold and process the lenses of the first lens group. Because a first lens group exceeding the upper limit of Conditional Expression 1 has weak refractive power, it may be difficult to secure a back focal length, such that a vivid image may not be obtained.

Among Conditional Expressions, Conditional Expression 2 is a condition to limit zoom optical performance. For example, the zoom optical system satisfying Conditional Expression 2 obtains substantially useful optical performance.

Among Conditional Expressions, Conditional Expressions 3 and 9 to 13 are conditions to decrease chromatic aberration, coma aberration, and astigmatism. For example, a zoom optical system including plastic lenses satisfying numerical ranges of Conditional Expressions 3 and 9 to 13 have good chromatic aberration, coma aberration, and astigmatism characteristics.

Among Conditional Expressions, Conditional Expression 4 is a condition to decrease aberration and improve optical performance. For example, the first and second lens groups satisfying Conditional Expression 4 suitably correct astigmatism and coma aberration. Further, the zoom optical system satisfying Conditional Expression 4 have a zoom magnification of 5× to 6×, and an overall length of the optical system is significantly decreased.

Among Conditional Expressions, Conditional Expression 5 is a condition to limit a magnitude of refractive power of the second lens group. For example, in a case that the second lens group exceeds the lower limit of Conditional Expression 5, the second lens group will be difficult to manufacture. Also, in a case of the second lens group exceeding the upper limit of Conditional Expression 5, an amount of movement of the second lens group for a zoom operation may be large.

Among Conditional Expressions, Conditional Expression 6 is a condition to miniaturize the zoom optical system. For example, because a zoom optical system exceeding the upper limit of Conditional Expression 6 has a significant length, it may be difficult to mount the zoom optical system in a small terminal or mobile device.

Among Conditional Expressions, Conditional Expression 7 is a condition to miniaturize the zoom optical system and rapidly control an autofocusing (AF) function. For example, because in a zoom optical system exceeding the lower limit of Conditional Expression 7, movement displacement of the lens group to autofocus may be large, it may be difficult to miniaturize the zoom optical system. In contrast, in a zoom optical system exceeding the upper limit of Conditional Expression 7, a depth of focus may be large, making it difficult to control the AF function.

Among Conditional Expressions, Conditional Expression 8 is a condition to miniaturize the zoom optical system and implement high resolution. For example, in a zoom optical system exceeding the lower limit of Conditional Expression 8, a movement displacement of the third lens group may be large making it difficult to miniaturize the zoom optical system. In contrast, in a zoom optical system exceeding the upper limit of Conditional Expression 8, the second lens group would not correct spherical aberration making it difficult to implement vivid resolution.

Among Conditional Expressions, Conditional Expression 14 is a condition for implementing a vivid image. For example, a zoom optical system satisfying Conditional Expression 14 implements a vivid image in a low illumination environment.

Hereinafter, zoom optical systems according to several embodiments will be described.

Figure 2:
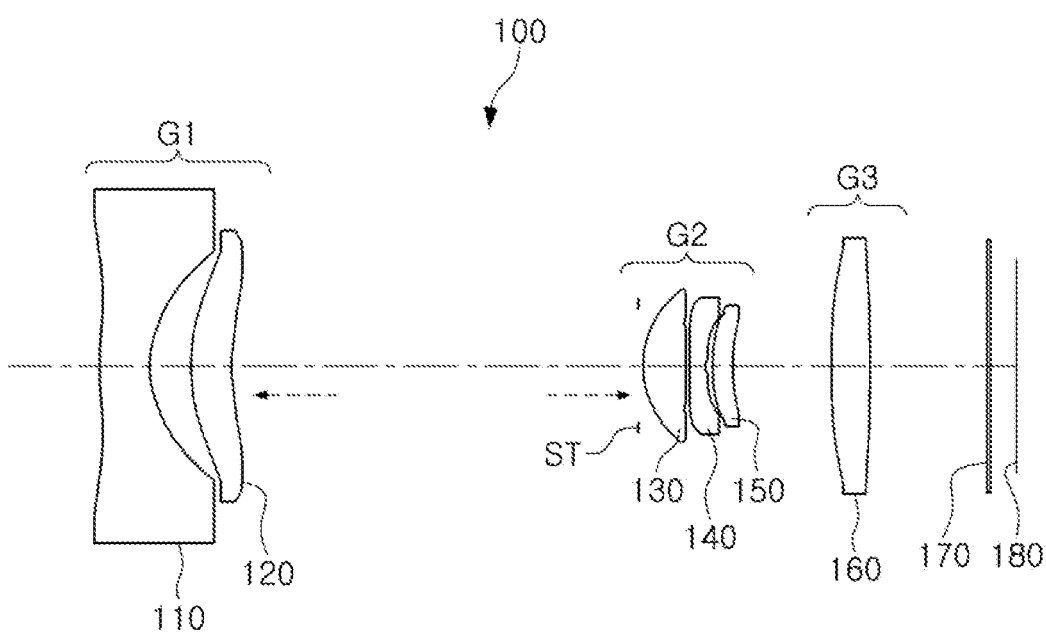
FIG. 2 is a configuration diagram of the zoom optical system illustrated in FIG. 1 in a wide-angle position.
Figure 3:
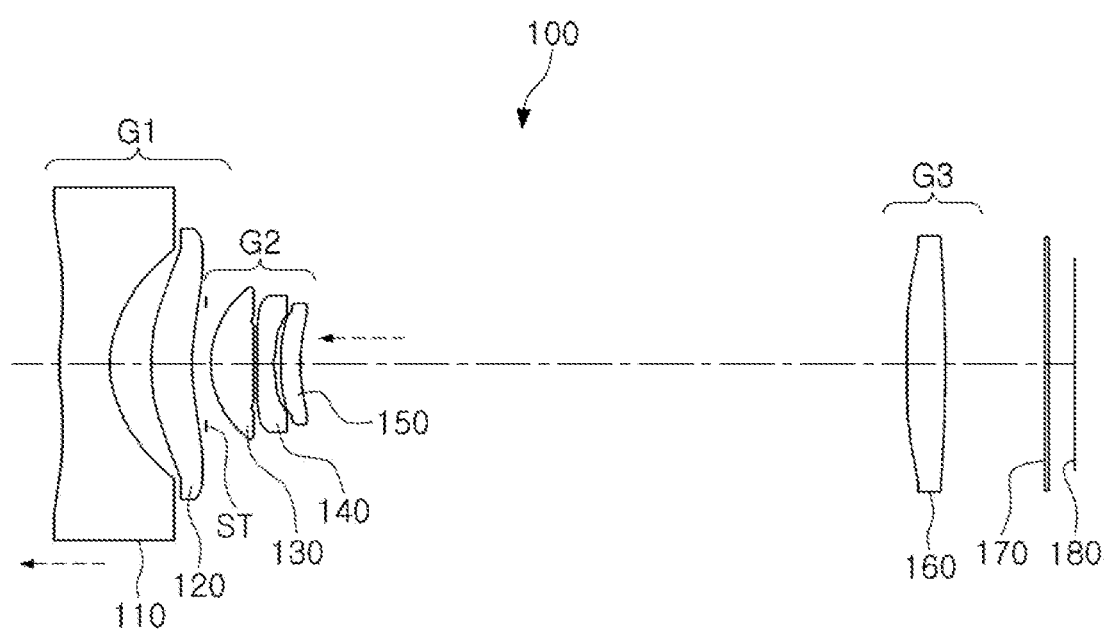
FIG. 3 is a configuration diagram of the zoom optical system illustrated in FIG. 1 in a telephoto position.

First, a zoom optical system, according to a first embodiment, will be described with reference to FIGS. 1 through 3.

A zoom optical system 100 includes a plurality of lenses. For example, the zoom optical system 100 includes a first lens 110, a second lens 120, a third lens 130, a fourth lens 140, a fifth lens 150, and a sixth lens 160.

The lenses configuring the zoom optical system 100 are classified into a plurality of lens groups. For example, the first and second lenses 110 and 120 configure a first lens group G1, the third to fifth lenses 130 to 150 configure a second lens group G2, and the sixth lens 160 configures a third lens group G3.

The first to third lens groups G1 to G3 move along an optical axis direction. For example, the first lens group G1 is positioned to be closest to an imaging plane when in a middle position and positioned to be farthest from the imaging plane when in a telephoto position. The second lens group G2 may be positioned to be closest to the imaging plane when in a wide-angle position and positioned to be farthest from the imaging plane when in the telephoto position. Conversely, the third lens group G3 is positioned at a substantially constant distance from the imaging plane.

The first lens group G1 includes two lenses. For example, the first lens group G1 includes the first and second lenses 110 and 120. The first lens 110 has a negative refractive power. An object-side surface of the first lens 110 is convex and an image-side surface thereof is concave. The first lens 110 is made of plastic. The first lens 110 has an aspherical surface. For example, both the object-side surface and the image-side surface of the first lens 110 are aspherical. The second lens 120 has a positive refractive power. An object-side surface of the second lens 120 is convex and an image-side surface thereof is concave. The second lens 120 is made of plastic. The second lens 120 may have an aspherical surface. For example, both the object-side surface and the image-side surface of the second lens 120 are aspherical.

The second lens group G2 includes three lenses. For example, the second lens group G2 includes the third to fifth lenses 130 to 150. The third lens 130 has a positive refractive power. Both surfaces of the third lens 130 are convex. The third lens 130 is made of plastic. The third lens 130 has an aspherical surface. For example, both an object-side surface and an image-side surface of the third lens 130 are aspherical. The fourth lens 140 has a negative refractive power. An object-side surface of the fourth lens 140 is convex and an image-side surface thereof is concave. The fourth lens 140 is made of plastic. The fourth lens 140 has an aspherical surface. For example, both the object-side surface and the image-side surface of the fourth lens 140 are aspherical. The fifth lens 150 has a positive refractive power. An object-side surface of the fifth lens 150 is convex and an image-side surface thereof is concave. The fifth lens 150 is made of plastic. The fifth lens 150 has an aspherical surface. For example, both the object-side surface and the image-side surface of the fifth lens 150 are aspherical.

The third lens group G3 includes one or more lenses. For example, the third lens group G3 includes the sixth lens 160. The sixth lens 160 has a positive refractive power. Both surfaces of the sixth lens 160 are convex. The sixth lens 160 may be made of plastic. The sixth lens 160 has an aspherical surface. For example, both an object-side surface and an image-side surface of the sixth lens 160 are aspherical.

The zoom optical system 100 also includes a stop ST. In one example, the stop ST is disposed between the first and second lens groups G1 and G2. The stop ST disposed as described above adjusts an amount of light incident on an imaging plane 180.

The zoom optical system 100 includes a filter 170. In one example, the filter 170 is disposed between the third lens group G3 and the imaging plane 180. The filter 170 disposed as described above blocks infrared (IR) light from being incident on the imaging plane 180.

The zoom optical system 100 may include an image sensor. The image sensor provides the imaging plane 180 onto which light refracted by the lenses are imaged. In addition, the image sensor converts an optical signal formed on the imaging plane 180 into an electrical signal.

Figure 4:
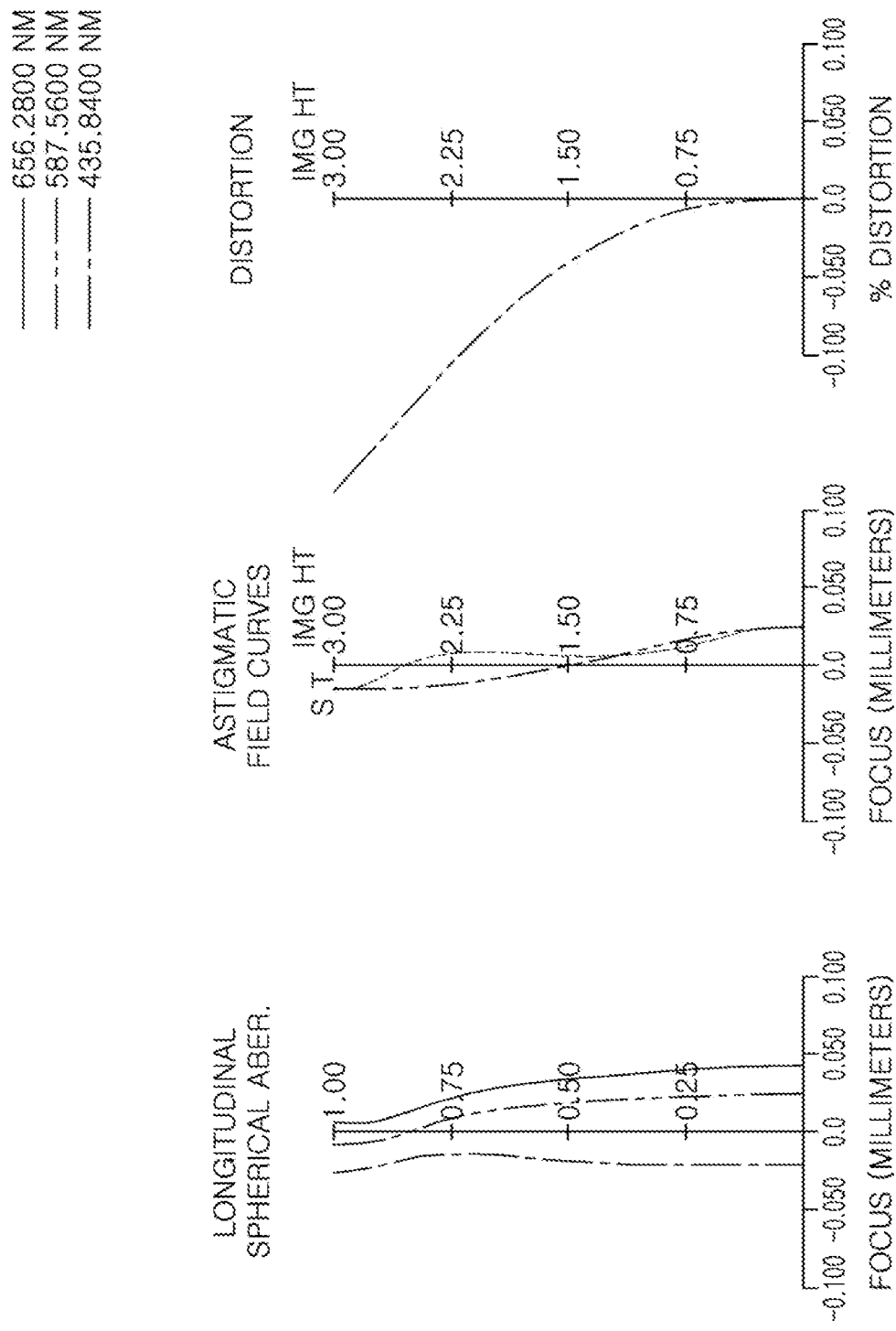
FIG. 4 is graphs representing aberration curves of the zoom optical system illustrated in FIG. 1 in the wide-angle position.
Figure 5:
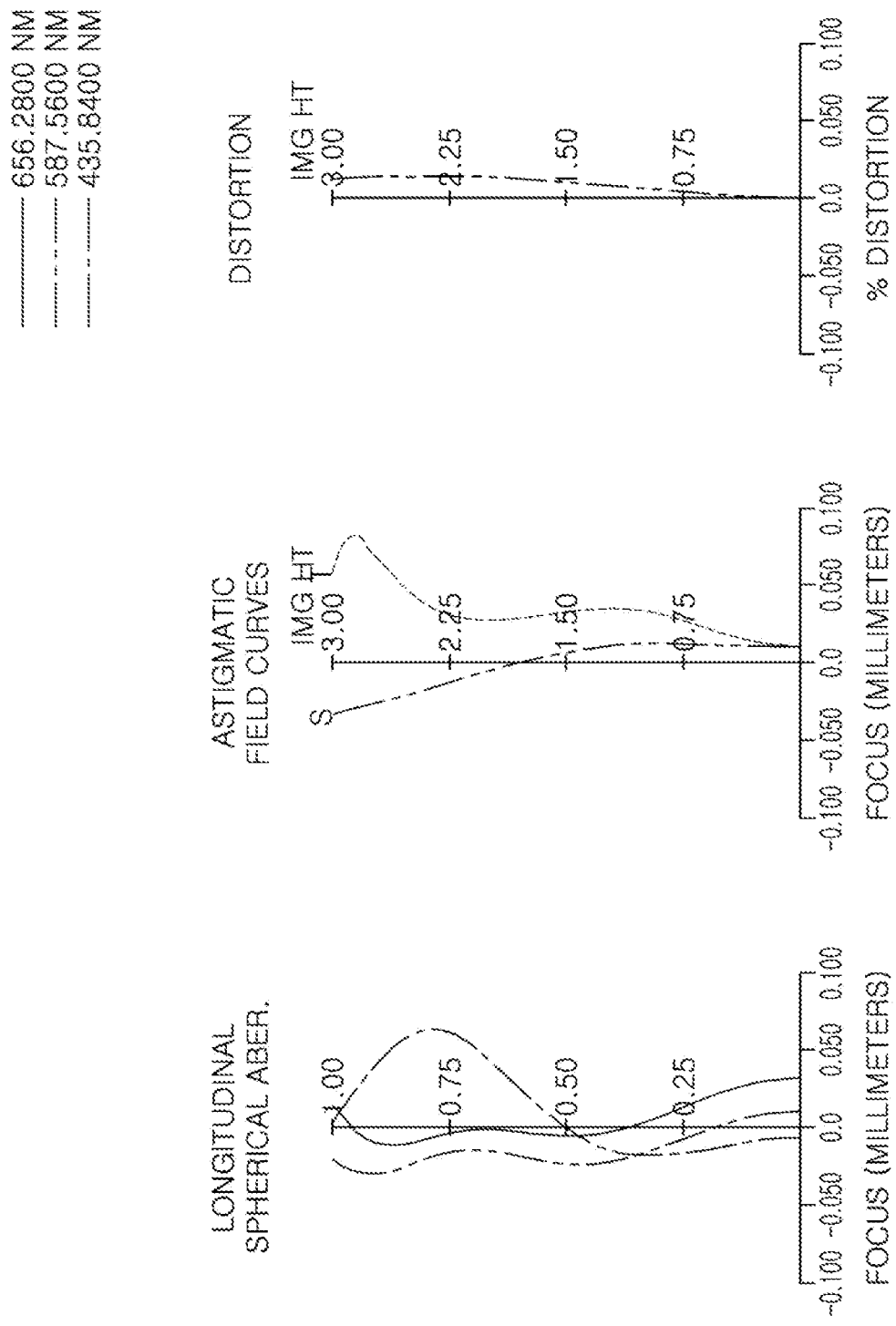
FIG. 5 are graphs representing aberration curves of the zoom optical system illustrated in FIG. 1 in the telephoto position.

The zoom optical system provides aberration characteristics as illustrated in FIGS. 4 and 5. FIG. 4 illustrates aberration characteristics in the wide-angle position and FIG. 5 illustrates aberration characteristics in the telephoto position.

FIG. 6 is a table representing respective characteristics of lenses of the zoom optical system, according to the first embodiment. FIG. 7 is a table representing an overall focal length, an F number, and D1, D2, and D3 values depending on positions of the wide-angle position, the middle position, and the telephoto position. FIG. 8 is a table representing aspherical characteristics of the zoom optical system, according to the first embodiment.

As illustrated in FIG. 7, a distance D1 between the first and second lens groups G1 and G2 is longest in the wide-angle position and is shortest in the telephoto position. Conversely, a distance D2 between the second and third lens groups G2 and G3 is shortest in the wide-angle position and is longest in the telephoto position. However, a distance between the third lens group G3 and the imaging plane 180 are substantially constant regardless of the wide-angle position, the middle position, and the telephoto position. In an embodiment, a zoom magnification of the zoom optical system 100 is substantially 4.7.

Figure 9:
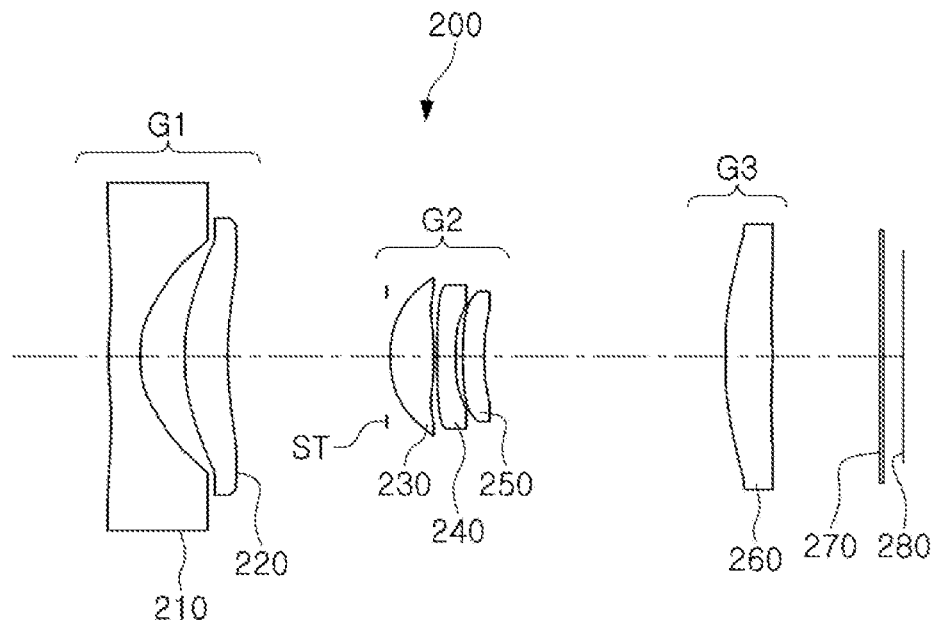
FIG. 9 is a configuration diagram of a zoom optical system, according to a second embodiment, in a middle position.
Figure 10:
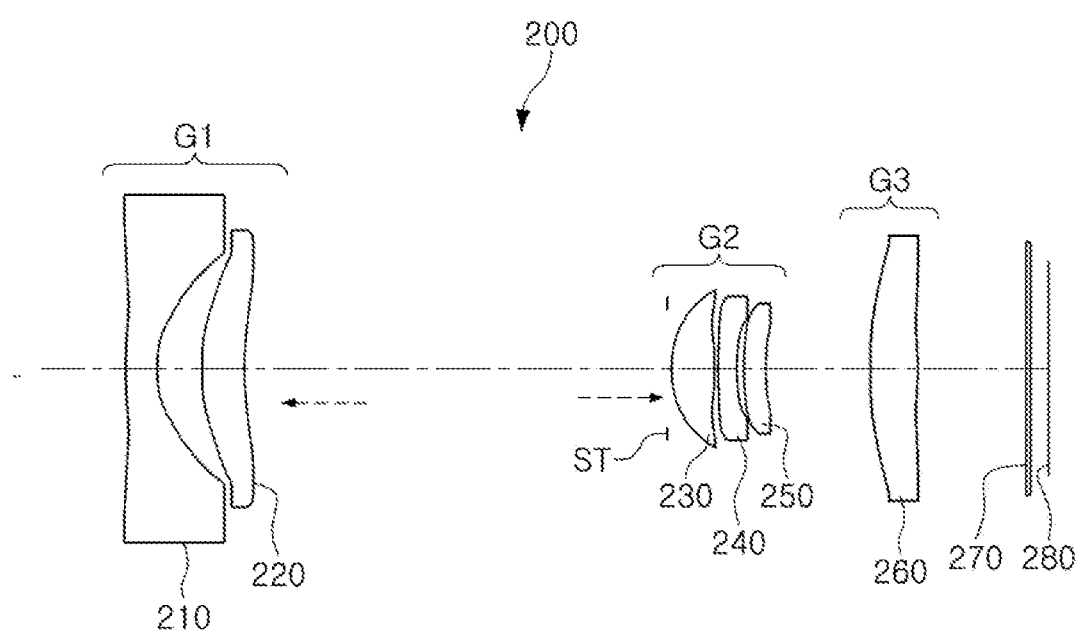
FIG. 10 is a configuration diagram of the zoom optical system illustrated in FIG. 9 in a wide-angle position.
Figure 11:
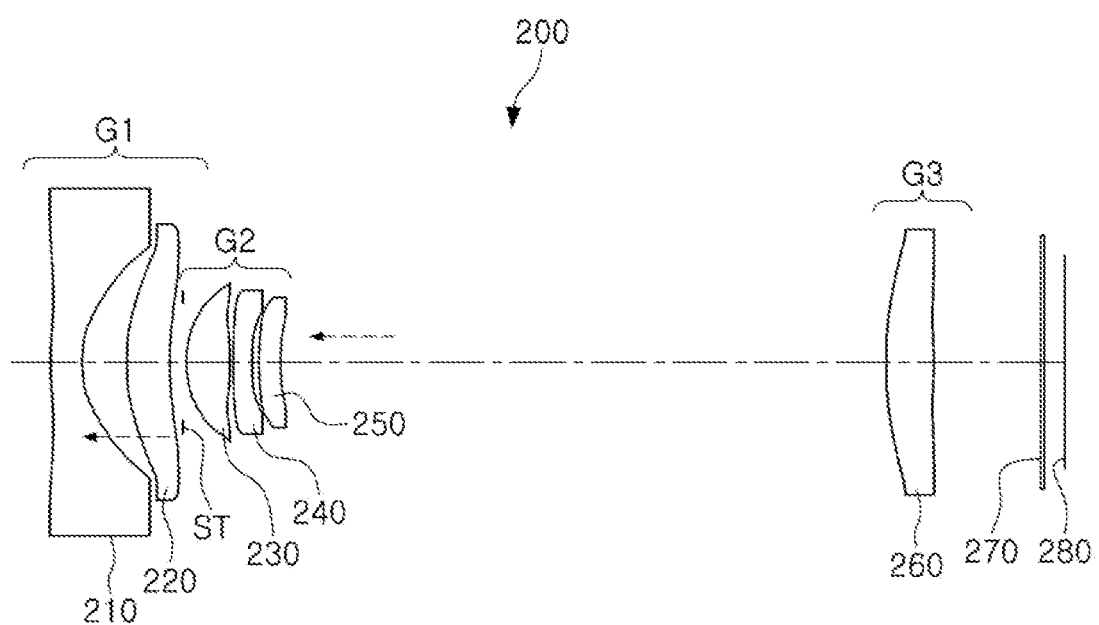
FIG. 11 is a configuration diagram of the zoom optical system illustrated in FIG. 9 in a telephoto position.

A zoom optical system, according to a second embodiment, will be described with reference to FIGS. 9 through 11.

A zoom optical system 200 includes a plurality of lenses. For example, the zoom optical system 200 includes a first lens 210, a second lens 220, a third lens 230, a fourth lens 240, a fifth lens 250, and a sixth lens 260.

The lenses configuring the zoom optical system 200 are classified into a plurality of lens groups. For example, the first and second lenses 210 and 220 configure a first lens group G1, the third to fifth lenses 230 to 250 configure a second lens group G2, and the sixth lens 260 configure a third lens group G3.

The first to third lens groups G1 to G3 move along an optical axis direction. For example, the first lens group G1 is positioned to be closest to an imaging plane when in a middle position and positioned to be farthest from the imaging plane when in a telephoto position. The second lens group G2 is positioned to be closest to the imaging plane when in a wide-angle position and positioned to be farthest from the imaging plane when in the telephoto position. Conversely, the third lens group G3 is positioned at a substantially constant distance from the imaging plane.

The first lens group G1 includes two lenses. For example, the first lens group G1 includes the first and second lenses 210 and 220. The first lens 210 has a negative refractive power. An object-side surface of the first lens 210 is convex and an image-side surface thereof is concave. The first lens 210 may be made of plastic. The first lens 210 has an aspherical surface. For example, both the object-side surface and the image-side surface of the first lens 210 are aspherical. The second lens 220 has a positive refractive power. An object-side surface of the second lens 220 is convex and an image-side surface thereof is concave. The second lens 220 may be made of plastic. The second lens 220 has an aspherical surface. For example, both the object-side surface and the image-side surface of the second lens 220 are aspherical.

The second lens group G2 includes three lenses. For example, the second lens group G2 includes the third to fifth lenses 230 to 250. The third lens 230 has a positive refractive power. Both surfaces of the third lens 230 are convex. The third lens 230 may be made of plastic. The third lens 230 has an aspherical surface. For example, both an object-side surface and an image-side surface of the third lens 230 are aspherical. The fourth lens 240 has a negative refractive power. An object-side surface of the fourth lens 240 is convex and an image-side surface thereof is concave. The fourth lens 240 is made of plastic. The fourth lens 240 has an aspherical surface. For example, both the object-side surface and the image-side surface of the fourth lens 240 are aspherical. The fifth lens 250 has a positive refractive power. An object-side surface of the fifth lens 250 is convex and an image-side surface thereof is concave. The fifth lens 250 is made of plastic. The fifth lens 250 has an aspherical surface. For example, both the object-side surface and the image-side surface of the fifth lens 250 are aspherical.

The third lens group G3 includes one or more lenses. For example, the third lens group G3 includes the sixth lens 260. The sixth lens 260 has a positive refractive power. Both surfaces of the sixth lens 260 are convex. The sixth lens 260 may be made of plastic. The sixth lens 260 has an aspherical surface. For example, both an object-side surface and an image-side surface of the sixth lens 260 are aspherical.

The zoom optical system 200 includes a stop ST. In one example, the stop ST is disposed between the first and second lens groups G1 and G2. The stop ST disposed as described above adjusts an amount of light incident on an imaging plane 280.

The zoom optical system 200 includes a filter 270. For example, the filter 270 is disposed between the third lens group G3 and the imaging plane 280. The filter 270 disposed as described above blocks infrared (IR) light from being incident on the imaging plane 280.

The zoom optical system 200 includes an image sensor. The image sensor provides the imaging plane 280 on which light refracted by the lenses are imaged. In addition, the image sensor converts an optical signal formed on the imaging plane 280 into an electrical signal.

Figure 12:
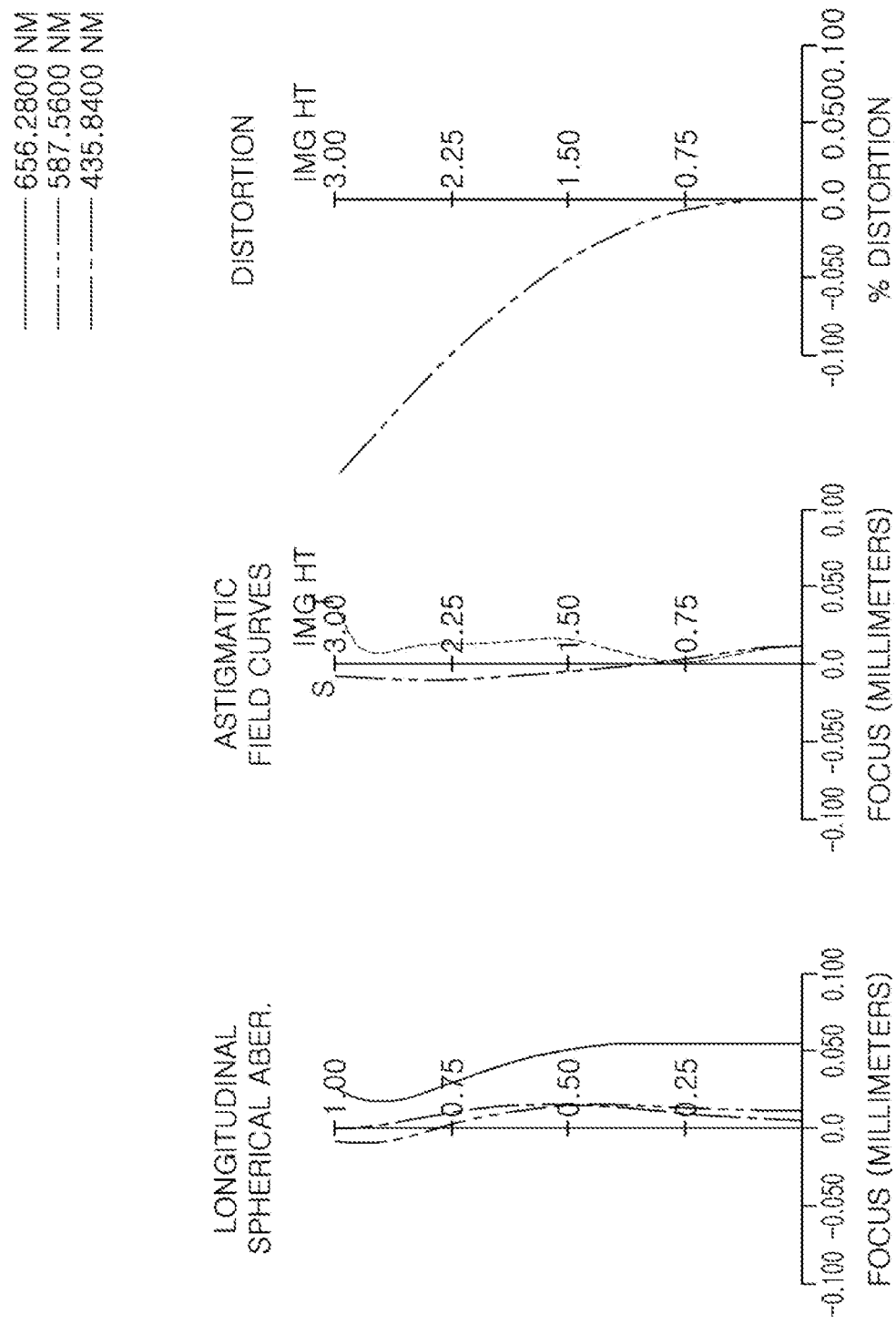
FIG. 12 are graphs representing aberration curves of the zoom optical system illustrated in FIG. 9 in the wide-angle position.
Figure 13:
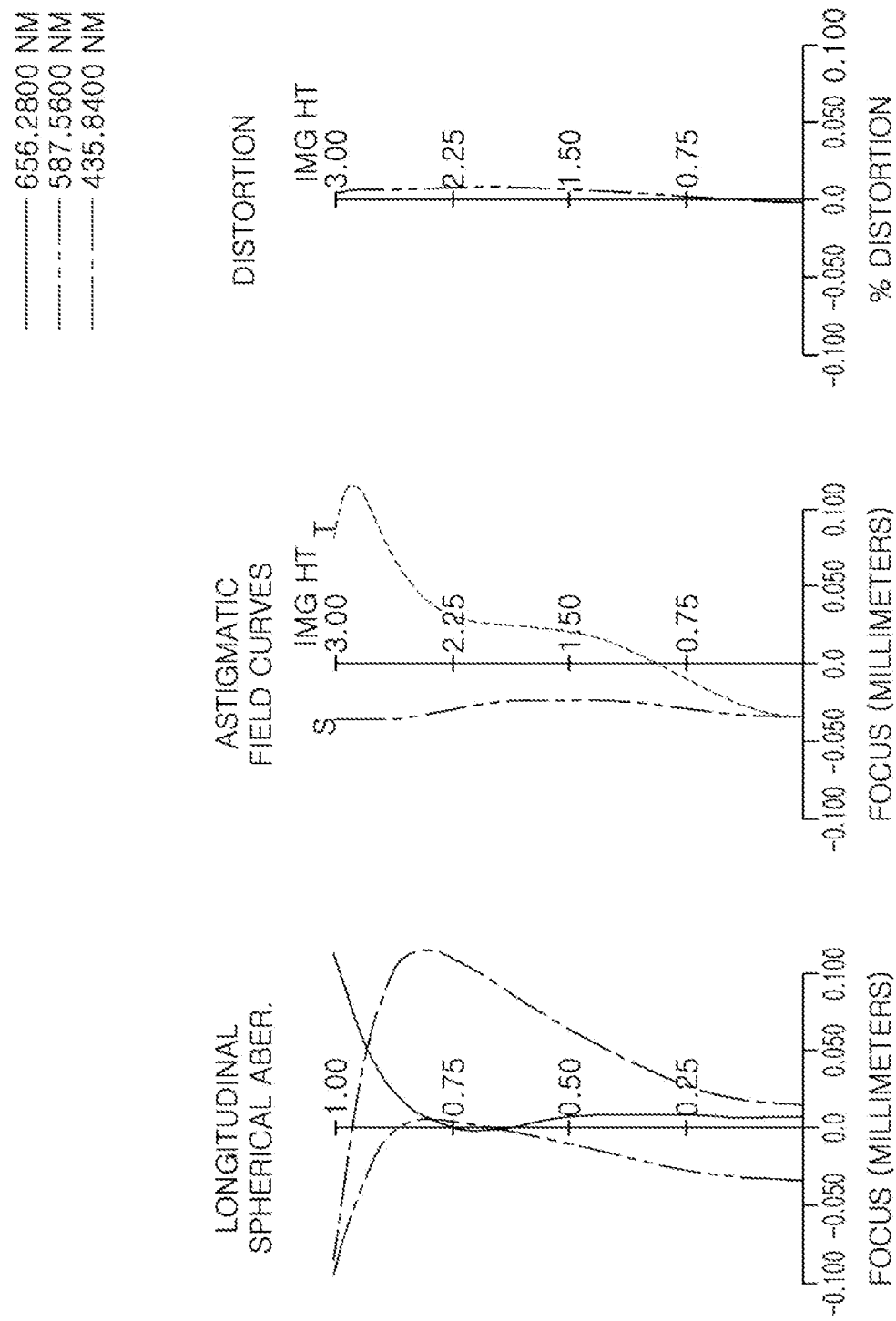
FIG. 13 are graphs representing aberration curves of the zoom optical system illustrated in FIG. 9 in the telephoto position.

The zoom optical system provides aberration characteristics as illustrated in FIGS. 12 and 13. FIG. 12 illustrates aberration characteristics in the wide-angle position and FIG. 13 illustrates aberration characteristics in the telephoto position.

FIG. 14 is a table representing respective characteristics of lenses of the zoom optical system, according to an embodiment. FIG. 15 is a table representing an overall focal length, an F number, and D1, D2, and D3 values depending on positions of the wide-angle position, the middle position, and the telephoto position. FIG. 16 is a table representing aspherical characteristics of the zoom optical system, according to an embodiment.

As illustrated in FIG. 15, a distance D1 between the first and second lens groups G1 and G2 is longest in the wide-angle position and is shortest in the telephoto position. In contrast, a distance D2 between the second and third lens groups G2 and G3 is shortest in the wide-angle position and is longest in the telephoto position. However, a distance between the third lens group G3 and the imaging plane 280 is substantially constant, regardless of the wide-angle position, the middle position, and the telephoto position. In an embodiment, a zoom magnification of the zoom optical system 200 is substantially 4.7.

Figure 17:
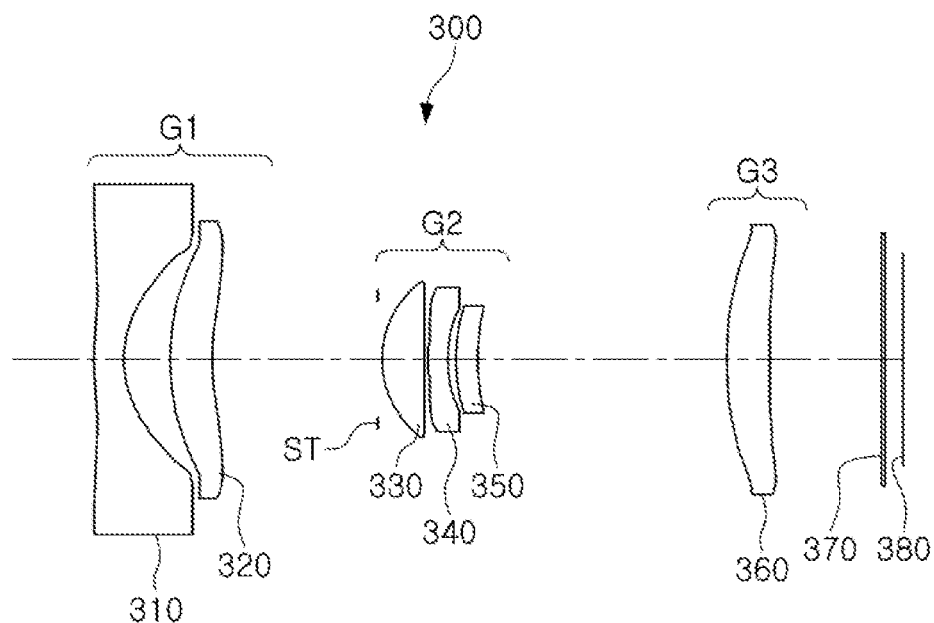
FIG. 17 is a configuration diagram of a zoom optical system, according to a third embodiment, in a middle position.
Figure 18:
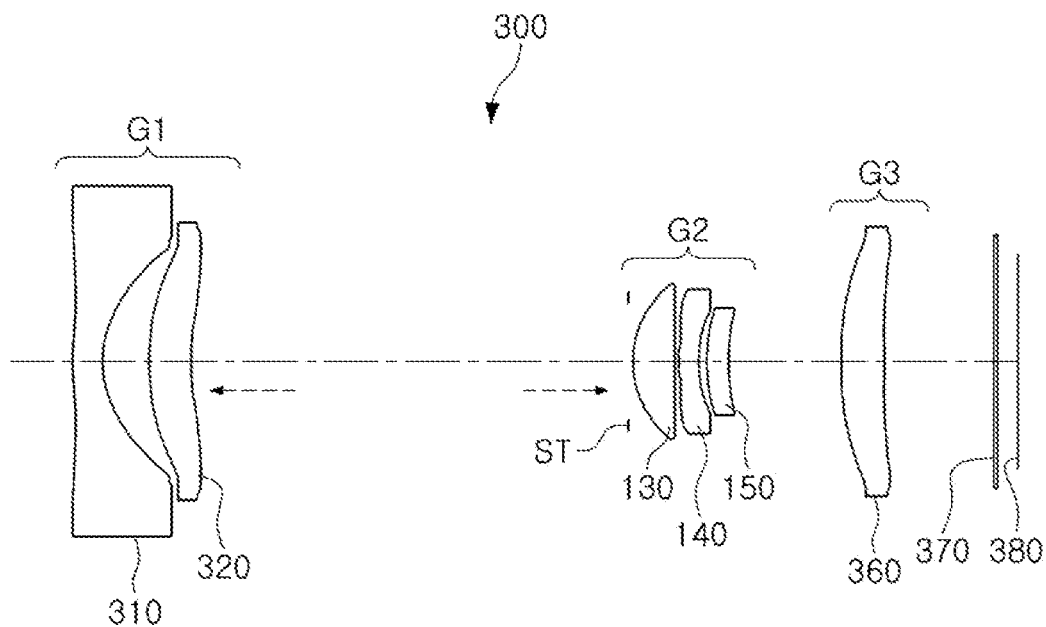
FIG. 18 is a configuration diagram of the zoom optical system illustrated in FIG. 17 in a wide-angle position.
Figure 19:
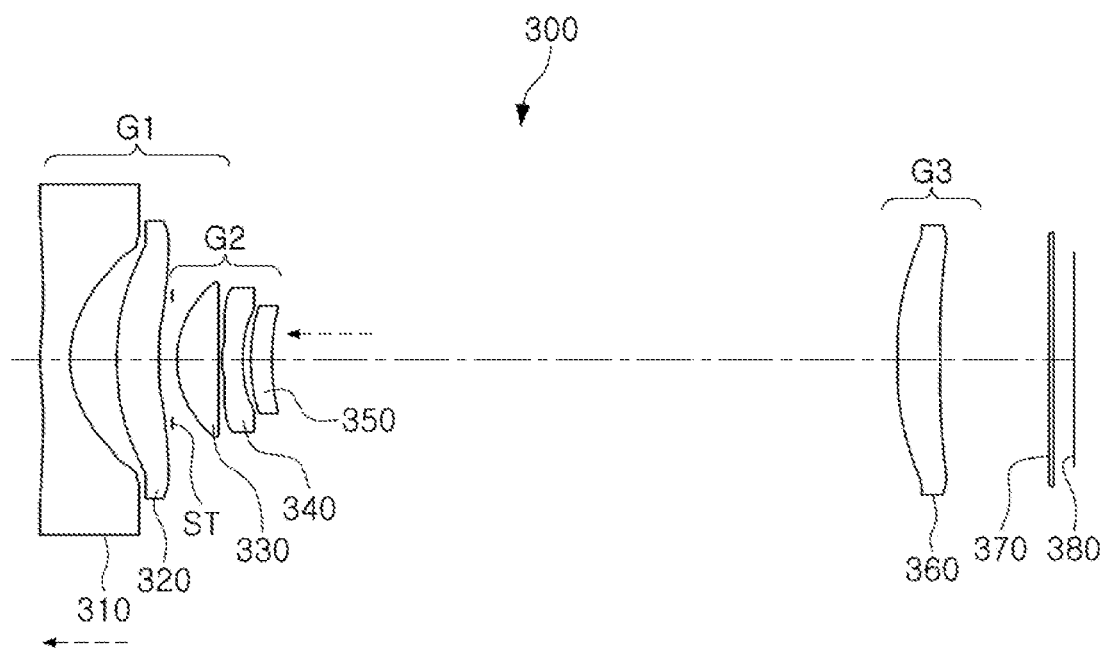
FIG. 19 is a configuration diagram of the zoom optical system illustrated in FIG. 17 in a telephoto position.

A zoom optical system, according to a third embodiment, will be described with reference to FIGS. 17 through 19.

A zoom optical system 300 includes a plurality of lenses. For example, the zoom optical system 300 includes a first lens 310, a second lens 320, a third lens 330, a fourth lens 340, a fifth lens 350, and a sixth lens 360.

The lenses configuring the zoom optical system 300 is classified into a plurality of lens groups. For example, the first and second lenses 310 and 320 configure a first lens group G1, the third to fifth lenses 330 to 350 configure a second lens group G2, and the sixth lens 360 configure a third lens group G3.

The first to third lens groups G1 to G3 move along an optical axis direction. For example, the first lens group G1 are positioned to be closest to an imaging plane in a middle position and positioned to be farthest from the imaging plane in a telephoto position. The second lens group G2 are positioned to be closest to the imaging plane in a wide-angle position and positioned to be farthest from the imaging plane in the telephoto position. Conversely, the third lens group G3 are positioned at a substantially constant distance from the imaging plane.

The first lens group G1 includes two lenses. For example, the first lens group G1 includes the first and second lenses 310 and 320. The first lens 310 has a negative refractive power. An object-side surface of the first lens 310 is convex and an image-side surface thereof is concave. The first lens 310 is made of plastic. The first lens 310 has an aspherical surface. For example, both the object-side surface and the image-side surface of the first lens 310 are aspherical. The second lens 320 has a positive refractive power. An object-side surface of the second lens 320 is convex and an image-side surface thereof is concave. The second lens 320 is made of plastic. The second lens 320 has an aspherical surface. For example, both the object-side surface and the image-side surface of the second lens 320 are aspherical.

The second lens group G2 includes three lenses. For example, the second lens group G2 includes the third to fifth lenses 330 to 350. The third lens 330 has a positive refractive power. Both surfaces of the third lens 330 are convex. The third lens 330 is made of plastic. The third lens 330 has an aspherical surface. For example, both an object-side surface and an image-side surface of the third lens 330 are aspherical. The fourth lens 340 has a negative refractive power. An object-side surface of the fourth lens 340 is convex and an image-side surface thereof is concave. The fourth lens 340 is made of plastic. The fourth lens 340 has an aspherical surface. For example, both the object-side surface and the image-side surface of the fourth lens 340 are aspherical. The fifth lens 350 has a positive refractive power. An object-side surface of the fifth lens 350 is convex and an image-side surface thereof is concave. The fifth lens 350 is made of plastic. The fifth lens 350 has an aspherical surface. For example, both the object-side surface and the image-side surface of the fifth lens 350 are aspherical.

The third lens group G3 includes one or more lenses. For example, the third lens group G3 includes the sixth lens 360. The sixth lens 360 has a positive refractive power. Both surfaces of the sixth lens 360 are convex. The sixth lens 360 is made of plastic. The sixth lens 360 has an aspherical surface. For example, both an object-side surface and an image-side surface of the sixth lens 360 are aspherical.

The zoom optical system 300 includes a stop ST. For example, the stop ST is disposed between the first and second lens groups G1 and G2. The stop ST disposed as described above adjusts an amount of light incident on an imaging plane 380.

The zoom optical system 300 includes a filter 370. For example, the filter 370 is disposed between the third lens group G3 and the imaging plane 380. The filter 370 disposed as described above blocks infrared (IR) light from being incident on the imaging plane 380.

The zoom optical system 300 includes an image sensor. The image sensor provides the imaging plane 380 on which light refracted by the lenses is imaged. In addition, the image sensor converts an optical signal formed on the imaging plane 380 into an electrical signal.

Figure 20:
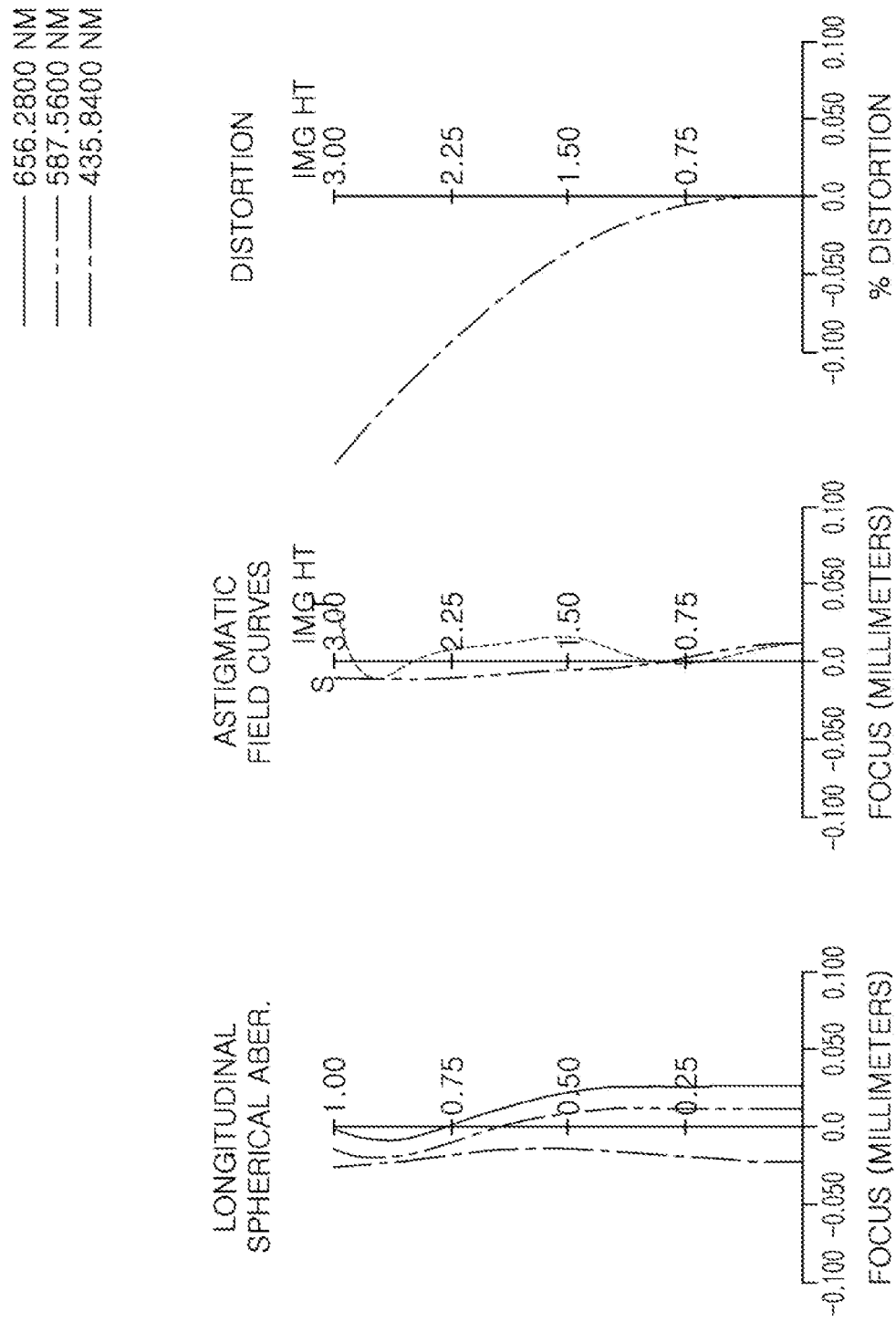
FIG. 20 are graphs representing aberration curves of the zoom optical system illustrated in FIG. 17 in the wide-angle position.
Figure 21:
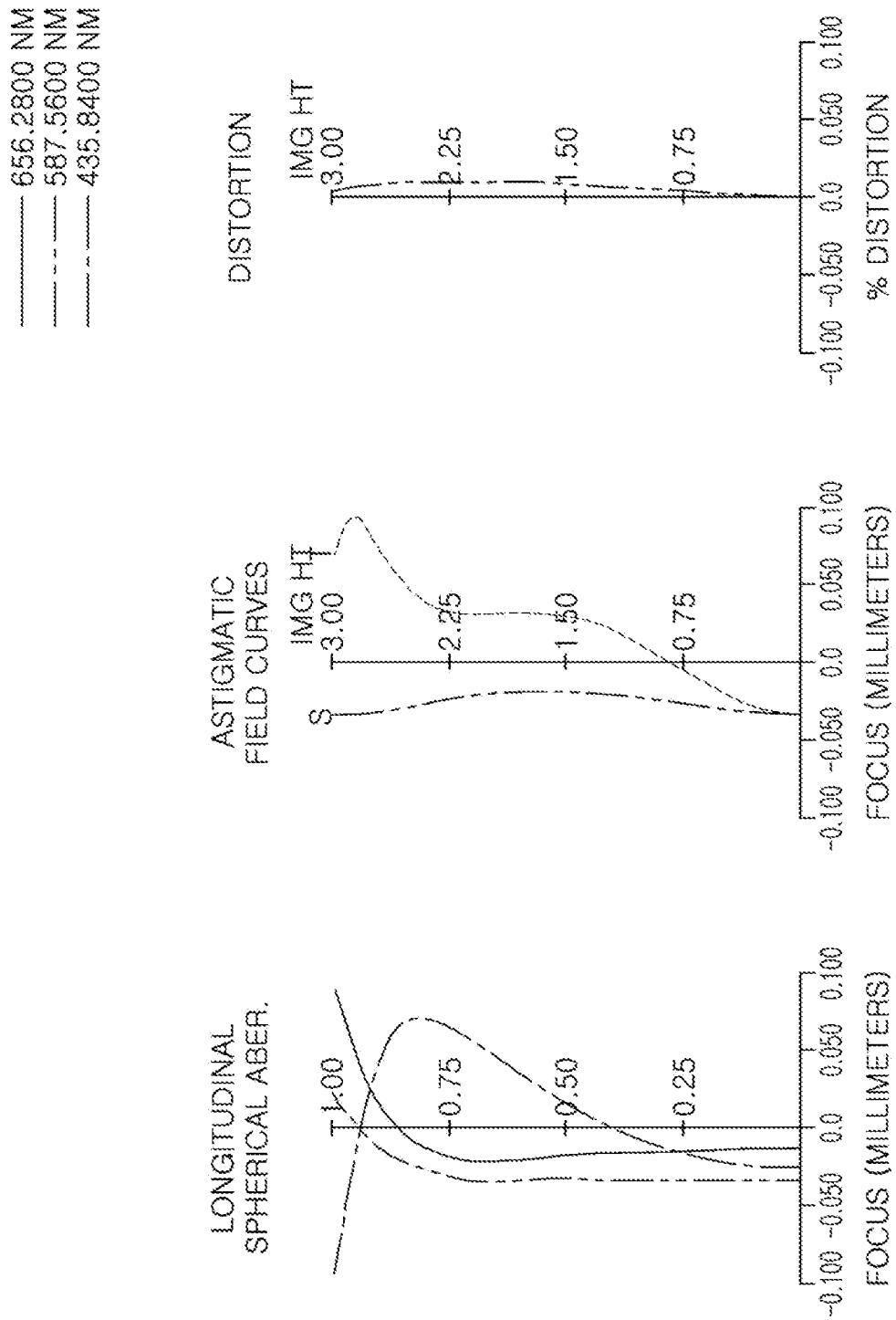
FIG. 21 are graphs representing aberration curves of the zoom optical system illustrated in FIG. 17 in the telephoto position.

The zoom optical system represents aberration characteristics illustrated in FIGS. 20 and 21. FIG. 20 illustrates aberration characteristics in the wide-angle position and FIG. 21 illustrates aberration characteristics in the telephoto position.

FIG. 22 is a table representing respective characteristics of lenses of the zoom optical system, according to an embodiment. FIG. 23 is a table representing an overall focal length, an F number, and D1, D2, and D3 values depending on positions of the wide-angle position, the middle position, and the telephoto position. FIG. 24 is a table representing aspherical characteristics of the zoom optical system, according to an embodiment.

As illustrated in FIG. 23, a distance D1 between the first and second lens groups G1 and G2 is longest in the wide-angle position and is shortest in the telephoto position. In contrast, a distance D2 between the second and third lens groups G2 and G3 is shortest in the wide-angle position and is longest in the telephoto position. However, a distance between the third lens group G3 and the imaging plane 380 is substantially constant regardless of the wide-angle position, the middle position, and the telephoto position. In an embodiment, a zoom magnification of the zoom optical system 300 is substantially 4.7.

Figure 25:
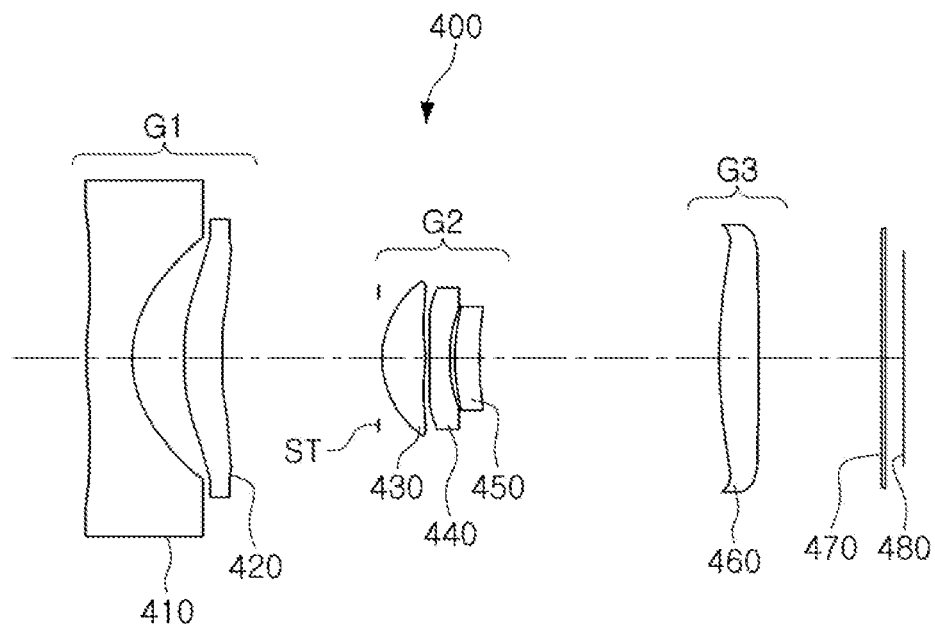
FIG. 25 is a configuration diagram of a zoom optical system, according to a fourth embodiment, in a middle position.
Figure 26:
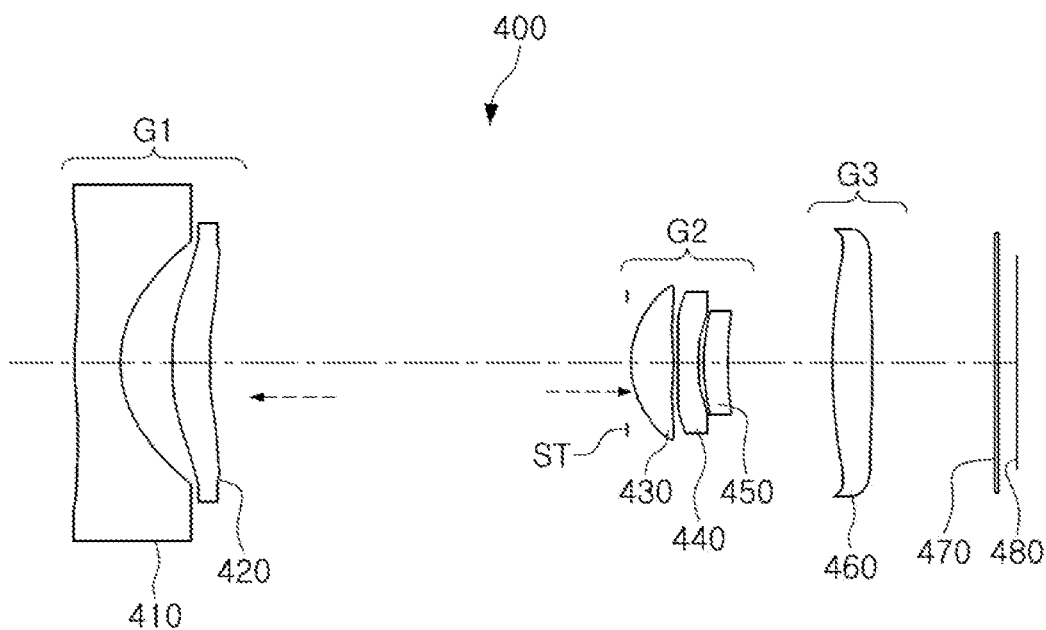
FIG. 26 is a configuration diagram of the zoom optical system illustrated in FIG. 25 in a wide-angle position.
Figure 27:
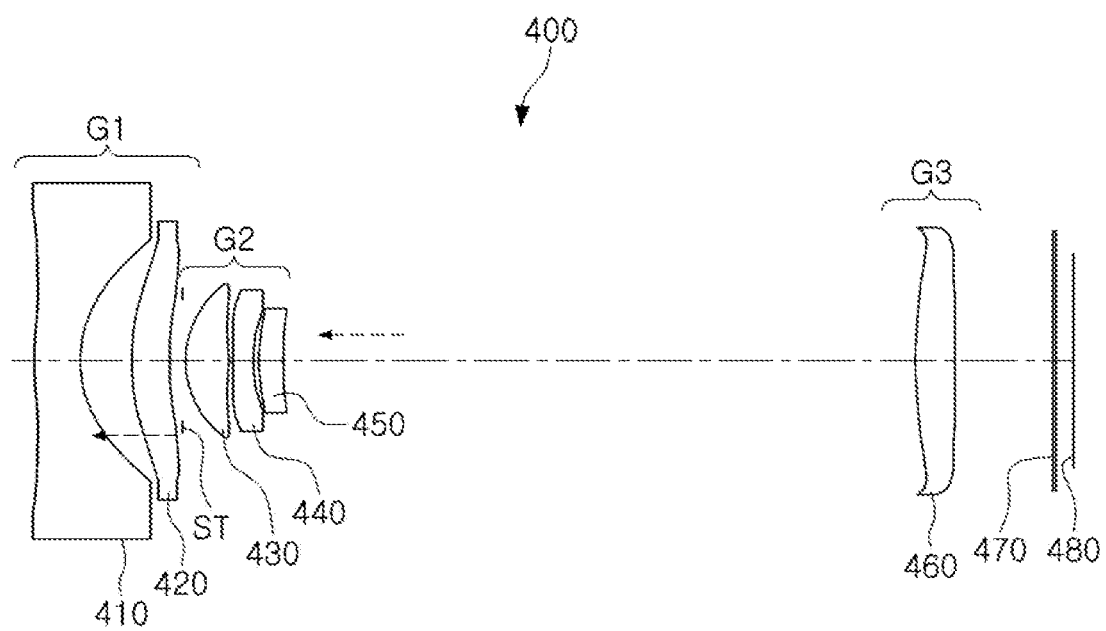
FIG. 27 is a configuration diagram of the zoom optical system illustrated in FIG. 25 in a telephoto position.

A zoom optical system, according to a fourth embodiment, will be described with reference to FIGS. 25 through 27.

A zoom optical system 400 includes a plurality of lenses. For example, the zoom optical system 400 includes a first lens 410, a second lens 420, a third lens 430, a fourth lens 440, a fifth lens 450, and a sixth lens 460.

The lenses configuring the zoom optical system 400 are classified into a plurality of lens groups. For example, the first and second lenses 410 and 420 configure a first lens group G1, the third to fifth lenses 430 to 450 configure a second lens group G2, and the sixth lens 460 configure a third lens group G3.

The first to third lens groups G1 to G3 move along an optical axis direction. For example, the first lens group G1 is positioned to be closest to an imaging plane in a middle position and positioned to be farthest from the imaging plane in a telephoto position. The second lens group G2 is positioned to be closest to the imaging plane in a wide-angle position and positioned to be farthest from the imaging plane in the telephoto position. Conversely, the third lens group G3 is positioned at a substantially constant distance from the imaging plane.

The first lens group G1 includes two lenses. For example, the first lens group G1 includes the first and second lenses 410 and 420. The first lens 410 has a negative refractive power. An object-side surface of the first lens 410 is convex and an image-side surface thereof is concave. The first lens 410 is made of plastic. The first lens 410 has an aspherical surface. For example, both the object-side surface and the image-side surface of the first lens 410 are aspherical. The second lens 420 has a positive refractive power. An object-side surface of the second lens 420 is convex and an image-side surface thereof is concave. The second lens 420 is made of plastic. The second lens 420 has an aspherical surface. For example, both the object-side surface and the image-side surface of the second lens 420 are aspherical.

The second lens group G2 includes three lenses. For example, the second lens group G2 includes the third to fifth lenses 430 to 450. The third lens 430 has a positive refractive power. Both surfaces of the third lens 430 is convex. The third lens 430 is made of plastic. The third lens 430 has an aspherical surface. For example, both an object-side surface and an image-side surface of the third lens 430 are aspherical. The fourth lens 440 has a negative refractive power. An object-side surface of the fourth lens 440 is convex and an image-side surface thereof is concave. The fourth lens 440 is made of plastic. The fourth lens 440 has an aspherical surface. For example, both the object-side surface and the image-side surface of the fourth lens 440 are aspherical. The fifth lens 450 has a positive refractive power. An object-side surface of the fifth lens 450 is convex and an image-side surface thereof is concave. The fifth lens 450 is made of plastic. The fifth lens 450 has an aspherical surface. For example, both the object-side surface and the image-side surface of the fifth lens 450 are aspherical.

The third lens group G3 includes one or more lenses. For example, the third lens group G3 is comprised of the sixth lens 460. The sixth lens 460 has a positive refractive power. Both surfaces of the sixth lens 460 are convex. The sixth lens 460 is made of plastic. The sixth lens 460 has an aspherical surface. For example, both an object-side surface and an image-side surface of the sixth lens 460 are aspherical.

The zoom optical system 400 includes a stop ST. For example, the stop ST is disposed between the first and second lens groups G1 and G2. The stop ST disposed, as described above, adjusts an amount of light incident on an imaging plane 480.

The zoom optical system 400 includes a filter 470. For example, the filter 470 is disposed between the third lens group G3 and the imaging plane 480. The filter 470 disposed, as described above, blocks infrared (IR) light from being incident on the imaging plane 480.

The zoom optical system 400 may include an image sensor. The image sensor provides the imaging plane 480 onto which light refracted by the lenses is imaged. In addition, the image sensor converts an optical signal formed on the imaging plane 480 into an electrical signal.

Figure 28:
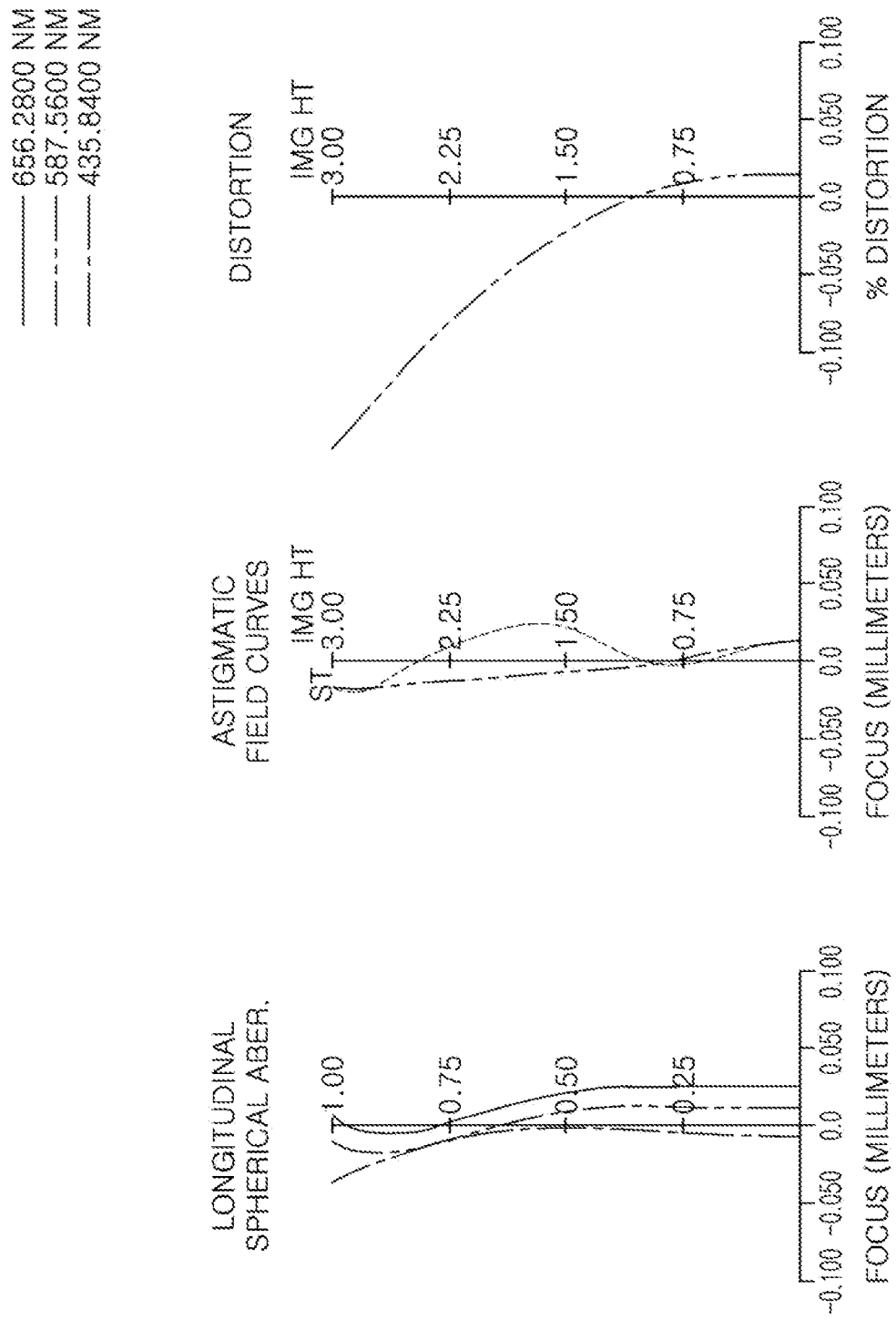
FIG. 28 are graphs representing aberration curves of the zoom optical system illustrated in FIG. 25 in the wide-angle position.
Figure 29:
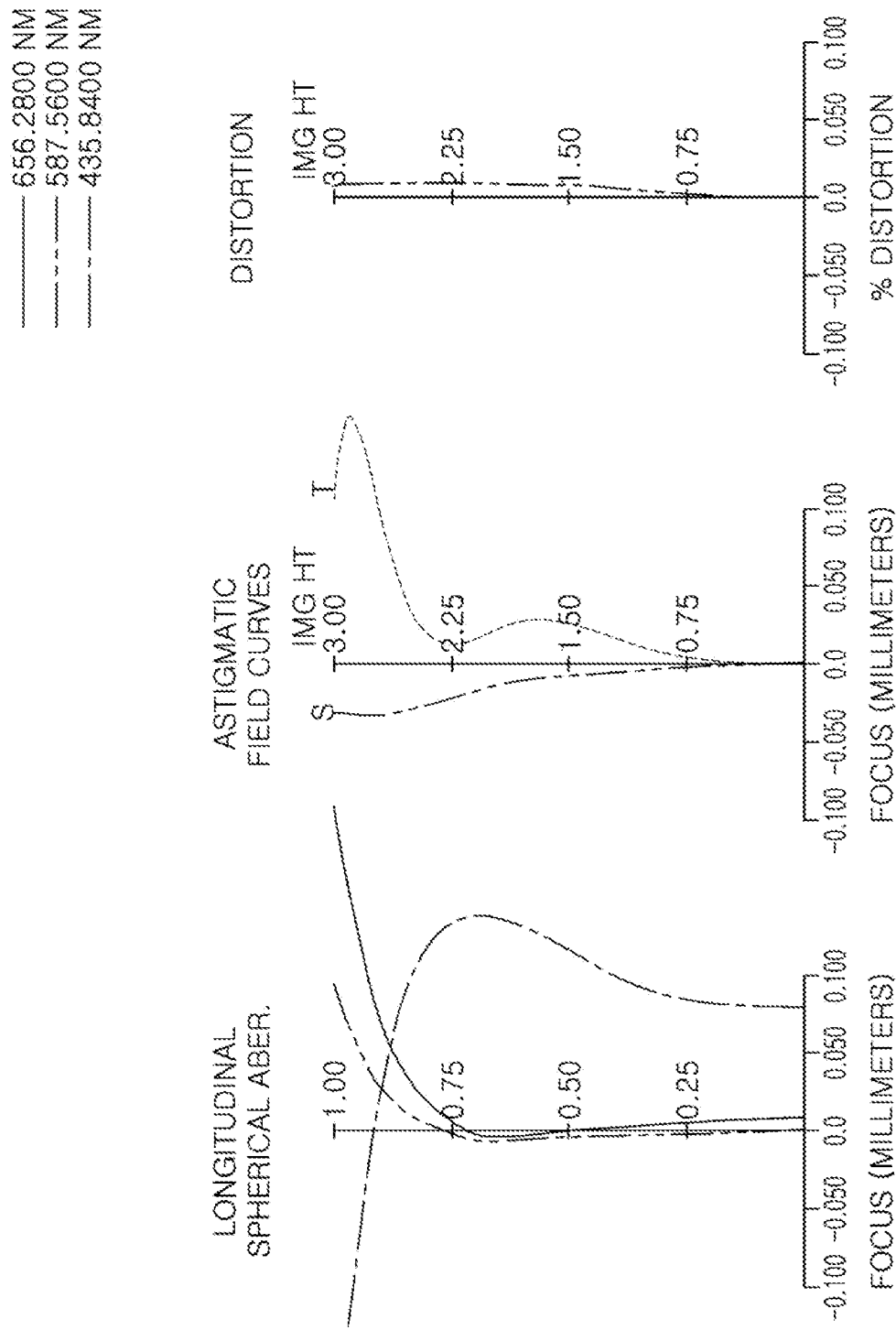
FIG. 29 are graphs representing aberration curves of the zoom optical system illustrated in FIG. 25 in the telephoto position.

The zoom optical system represents aberration characteristics illustrated in FIGS. 28 and 29. FIG. 28 illustrates aberration characteristics in the wide-angle position and FIG. 29 illustrates aberration characteristics in the telephoto position.

FIG. 30 is a table representing respective characteristics of lenses of the zoom optical system, according to an embodiment. FIG. 31 is a table representing an overall focal length, an F number, and D1, D2, and D3 values depending on positions of the wide-angle position, the middle position, and the telephoto position. FIG. 32 is a table representing aspherical characteristics of the zoom optical system, according to an embodiment.

As illustrated in FIG. 31, a distance D1 between the first and second lens groups G1 and G2 is longest in the wide-angle position and is shortest in the telephoto position. In contrast, a distance D2 between the second and third lens groups G2 and G3 is shortest in the wide-angle position and is longest in the telephoto position. However, a distance between the third lens group G3 and the imaging plane 480 is substantially constant regardless of the wide-angle position, the middle position, and the telephoto position. In an embodiment, a zoom magnification of the zoom optical system 400 is substantially 4.7.

Figure 33:
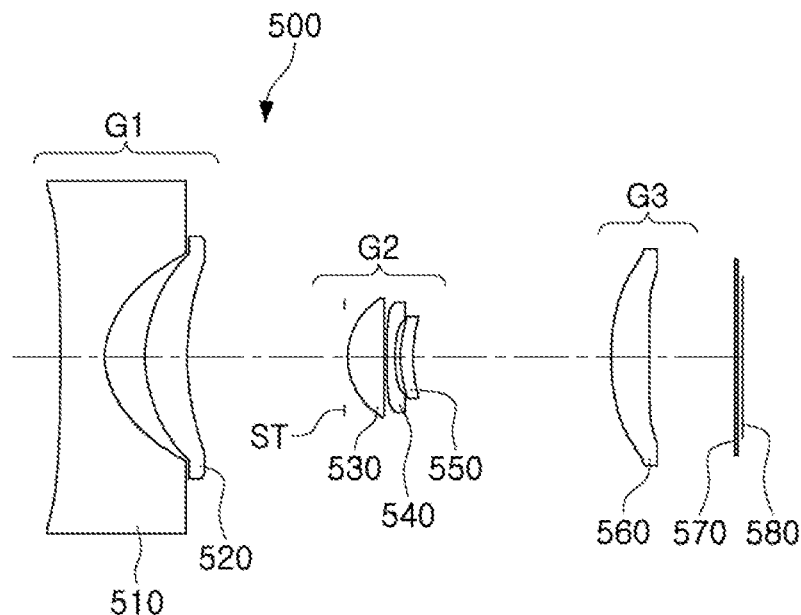
FIG. 33 is a configuration diagram of a zoom optical system, according to a fifth embodiment, in a middle position.
Figure 34:
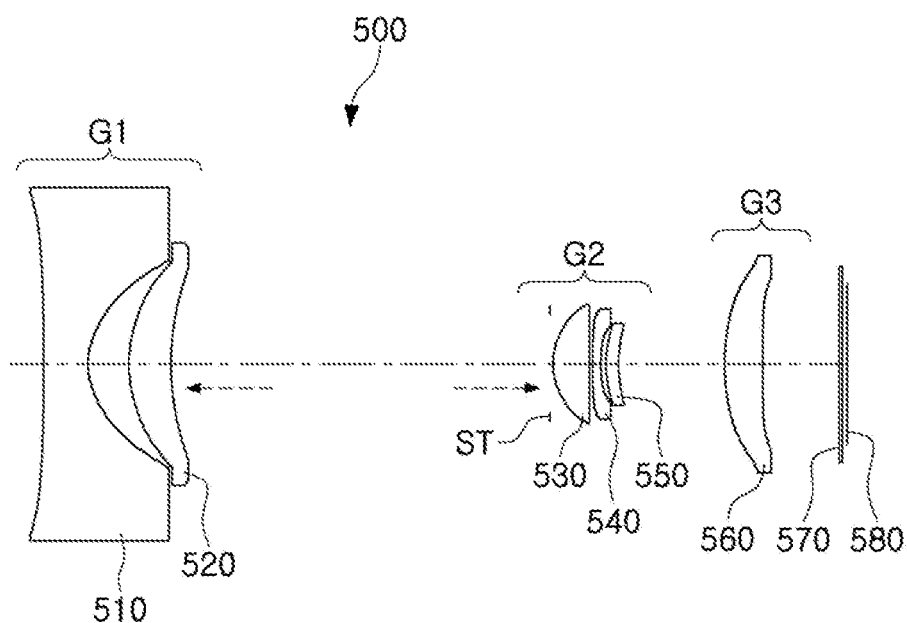
FIG. 34 is a configuration diagram of the zoom optical system illustrated in FIG. 33 in a wide-angle position.
Figure 35:
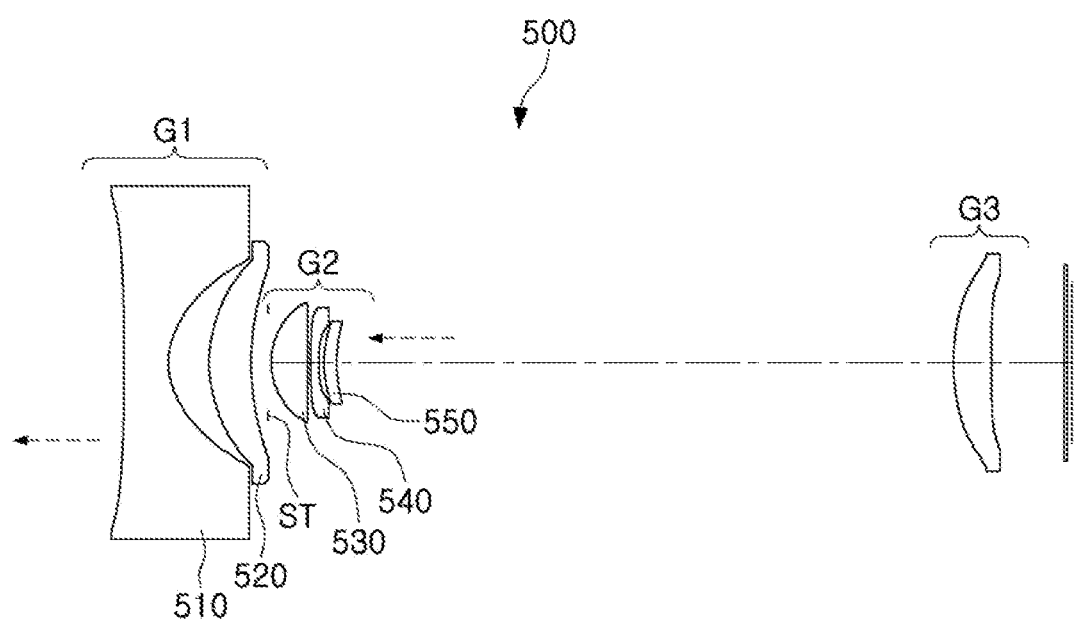
FIG. 35 is a configuration diagram of the zoom optical system illustrated in FIG. 33 in a telephoto position.

A zoom optical system, according to a fifth embodiment, will be described with reference to FIGS. 33 through 35.

A zoom optical system 500 includes a plurality of lenses. For example, the zoom optical system 500 includes a first lens 510, a second lens 520, a third lens 530, a fourth lens 540, a fifth lens 550, and a sixth lens 560.

The lenses configuring the zoom optical system 500 is classified into a plurality of lens groups. For example, the first and second lenses 510 and 520 configure a first lens group G1, the third to fifth lenses 530 to 550 configure a second lens group G2, and the sixth lens 560 configure a third lens group G3.

The first to third lens groups G1 to G3 move along an optical axis direction. For example, the first lens group G1 is positioned to be closest to an imaging plane in a middle position and positioned to be farthest from the imaging plane in a telephoto position. The second lens group G2 is positioned to be closest to the imaging plane in a wide-angle position and positioned to be farthest from the imaging plane in the telephoto position. In contrast, the third lens group G3 is positioned at a substantially constant distance from the imaging plane.

The first lens group G1 includes two lenses. For example, the first lens group G1 includes the first and second lenses 510 and 520. The first lens 510 has a negative refractive power. An object-side surface of the first lens 510 is concave and an image-side surface thereof is concave. The first lens 510 is made of plastic. The first lens 510 has an aspherical surface. For example, both the object-side surface and the image-side surface of the first lens 510 are aspherical. The second lens 520 has a positive refractive power. An object-side surface of the second lens 520 is convex and an image-side surface thereof is concave. The second lens 520 is made of plastic. The second lens 520 has an aspherical surface. For example, both the object-side surface and the image-side surface of the second lens 520 is aspherical.

The second lens group G2 includes three lenses. For example, the second lens group G2 includes the third to fifth lenses 530 to 550. The third lens 530 has a positive refractive power. Both surfaces of the third lens 530 are convex. The third lens 530 is made of plastic. The third lens 530 has an aspherical surface. For example, both an object-side surface and an image-side surface of the third lens 530 are aspherical. The fourth lens 540 has a negative refractive power. An object-side surface of the fourth lens 540 is convex and an image-side surface thereof is concave. The fourth lens 540 is made of plastic. The fourth lens 540 has an aspherical surface. For example, both the object-side surface and the image-side surface of the fourth lens 540 are aspherical. The fifth lens 550 has a positive refractive power. An object-side surface of the fifth lens 550 is convex and an image-side surface thereof is concave. The fifth lens 550 is made of plastic. The fifth lens 550 has an aspherical surface. For example, both the object-side surface and the image-side surface of the fifth lens 550 are aspherical.

The third lens group G3 includes one or more lenses. For example, the third lens group G3 includes the sixth lens 560. The sixth lens 560 has a positive refractive power. Both surfaces of the sixth lens 560 are convex. The sixth lens 560 is made of plastic. The sixth lens 560 has an aspherical surface. For example, both an object-side surface and an image-side surface of the sixth lens 560 is aspherical.

The zoom optical system 500 includes a stop ST. For example, the stop ST is disposed between the first and second lens groups G1 and G2. The stop ST disposed as described above adjusts an amount of light incident on the imaging plane 580.

The zoom optical system 500 includes a filter 570. For example, the filter 570 is disposed between the third lens group G3 and the imaging plane 580. The filter 570 disposed as described above blocks infrared (IR) light from being incident on the imaging plane 580.

The zoom optical system 500 may include an image sensor. The image sensor provides the imaging plane 580 on which light refracted by the lenses is imaged. In addition, the image sensor converts an optical signal formed on the imaging plane 580 into an electrical signal.

Figure 36:
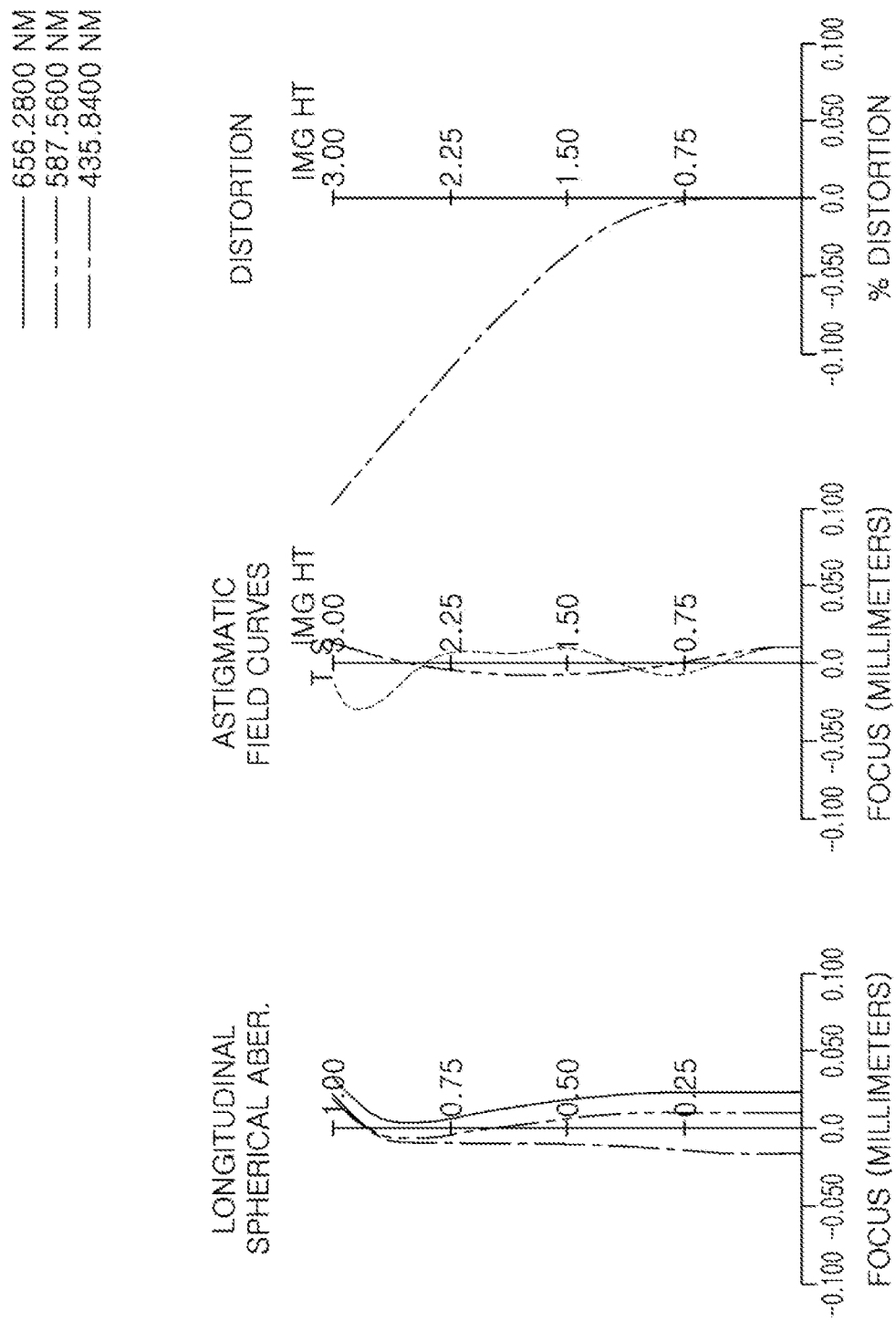
FIG. 36 are graphs representing aberration curves of the zoom optical system illustrated in FIG. 33 in the wide-angle position.
Figure 37:
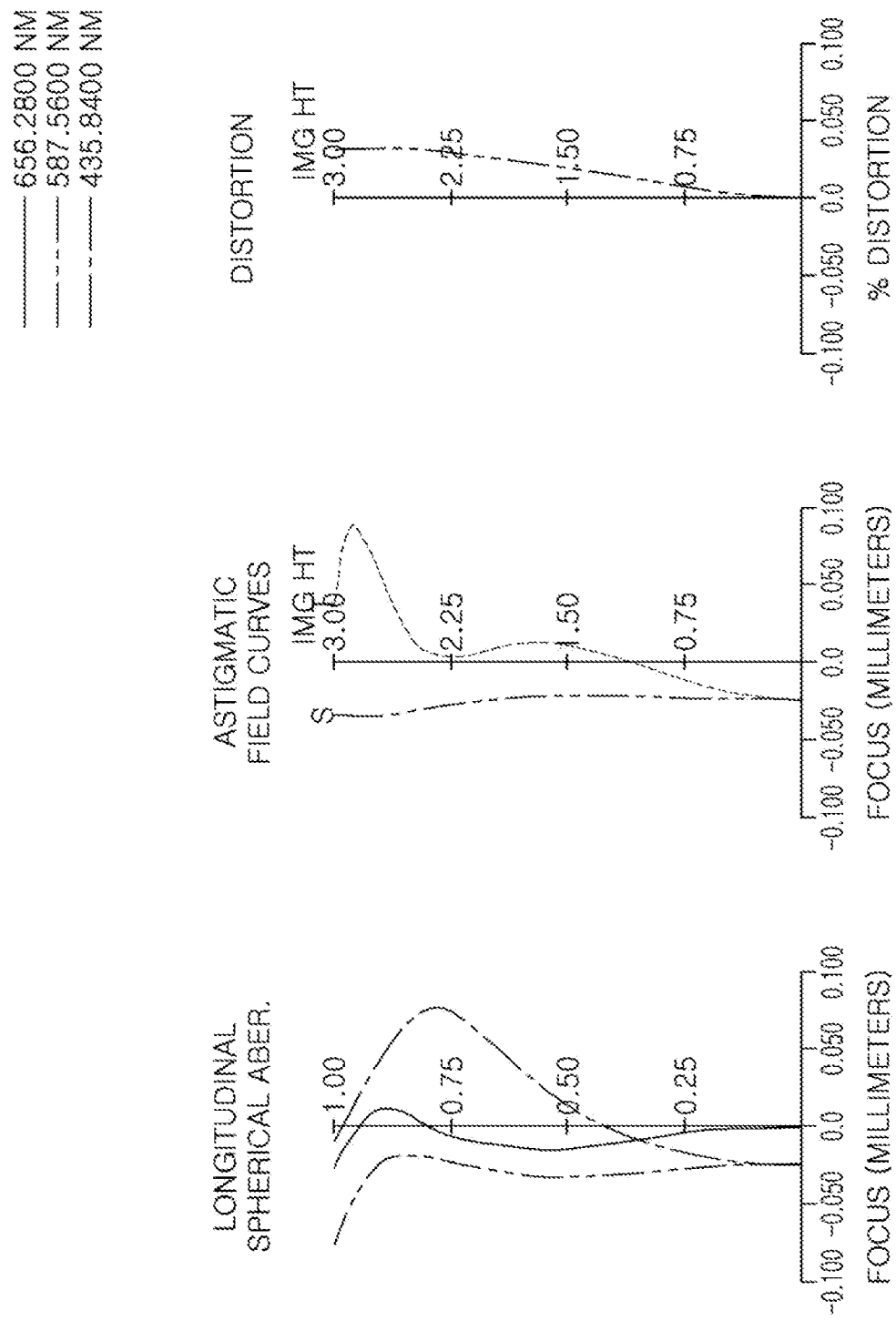
FIG. 37 are graphs representing aberration curves of the zoom optical system illustrated in FIG. 33 in the telephoto position.

The zoom optical system represent aberration characteristics illustrated in FIGS. 36 and 37. FIG. 36 illustrates aberration characteristics in the wide-angle position and FIG. 37 illustrates aberration characteristics in the telephoto position.

FIG. 38 is a table representing respective characteristics of lenses of the zoom optical system, according to an embodiment. FIG. 39 is a table representing an overall focal length, an F number, and D1, D2, and D3 values depending on positions of the wide-angle position, the middle position, and the telephoto position. FIG. 40 is a table representing aspherical characteristics of the zoom optical system, according to an embodiment.

As illustrated in FIG. 39, a distance D1 between the first and second lens groups G1 and G2 are longest in the wide-angle position and are shortest in the telephoto position. In contrast, a distance D2 between the second and third lens groups G2 and G3 is shortest in the wide-angle position and is longest in the telephoto position. However, a distance between the third lens group G3 and the imaging plane 580 is substantially constant regardless of the wide-angle position, the middle position, and the telephoto position. In an embodiment, a zoom magnification of the zoom optical system 500 is substantially 6.

Table 1 represents values of optical characteristics of the lens groups of the zoom optical systems, according to the first to fifth embodiments.

TABLE 1

| Remark | First Embodiment | Second Embodiment | Third Embodiment | Fourth Embodiment | Fifth Embodiment |
|---|---|---|---|---|---|
| fG1 | −8.7950 | −8.9320 | −8.9820 | −8.7920 | −8.1730 |
| fG2 | 7.2420 | 7.3940 | 7.4380 | 7.3120 | 7.7630 |
| fG3 | 22.6060 | 23.0260 | 23.2920 | 22.7060 | 17.0560 |
| MG2W | −0.5160 | −0.5070 | −0.5050 | −0.5150 | −0.4840 |
| MG3W | 0.8060 | 0.8050 | 0.8060 | 0.8070 | 0.7670 |
| MG2T | −2.3810 | −2.4060 | −2.4150 | −2.3590 | −2.8710 |
| MG3T | 0.8280 | 0.8070 | 0.8000 | 0.8360 | 0.7750 |
| TG1 | 3.6430 | 3.2440 | 3.1990 | 3.6330 | 4.6330 |
| TG2 | 2.5440 | 2.6780 | 2.6610 | 2.6260 | 2.3920 |
| TG3 | 1.0920 | 1.2510 | 1.1650 | 1.0890 | 1.3730 |

Table 2 represents calculated values of the zoom optical systems, according to the first to fifth embodiments, with respect to Conditional Expressions.

TABLE 2

| Remarks | Conditional Expression | First Embodiment | Second Embodiment | Third Embodiment | Fourth Embodiment | Fifth Embodiment |
|---|---|---|---|---|---|---|
| 1 | |fG1/fw| | 2.4056 | 2.4505 | 2.4643 | 2.4055 | 2.6925 |
| 2 | ft/fw | 4.7435 | 4.7565 | 4.7565 | 4.7447 | 5.9925 |
| 3 | n4 | 1.6360 | 1.6550 | 1.6550 | 1.6360 | 1.6360 |
| 4 | |fG2/fG1| | 0.8234 | 0.8278 | 0.8281 | 0.8317 | 0.9498 |
| 5 | fG2/fw | 1.9809 | 2.0286 | 2.0407 | 2.0006 | 2.5574 |
| 6 | TG1 + TG2 + TG3 | 7.2800 | 7.1600 | 7.1600 | 7.0300 | 8.4000 |
| 7 | 1 − (MG3T^2) | 0.3144 | 0.3488 | 0.3600 | 0.3011 | 0.3994 |
| 8 | MG2T/MG2W | 4.6143 | 4.7456 | 4.7822 | 4.5806 | 5.9318 |
| 9 | V1 | 56.510 | 56.510 | 56.510 | 55.710 | 56.510 |
| 10 | V1 − V2 | 32.610 | 32.610 | 32.610 | 31.810 | 32.610 |
| 11 | n3 | 1.5350 | 1.5420 | 1.5420 | 1.5350 | 1.5350 |
| 12 | n1 + n2 | 3.1670 | 3.1930 | 3.1930 | 3.1710 | 3.1670 |
| 13 | n4 − n1 | 0.1050 | 0.1170 | 0.1170 | 0.1010 | 0.1050 |
| 14 | fw/EPDw | 2.7550 | 2.8160 | 2.8550 | 2.8850 | 2.5520 |

As set forth above, according to embodiments, a zoom optical system is configured to be lighter in weight and having decreased aberrations.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A zoom optical system, comprising:
a first lens group comprising a negative refractive power;
a second lens group comprising a positive refractive power; and
a third lens group comprising a positive refractive power, wherein
the first to third lens groups are sequentially disposed from an object side toward an imaging plane,
upon zooming from a wide-angle position to a telephoto position, a gap between the first and second lens groups is decreased,
a gap between the second and third lens groups is adjustable,
the first lens group comprises a first lens and a second lens, the second lens group comprises a third lens having a convex image-side surface, a fourth lens, and a fifth lens, and the third group comprises a sixth lens, and
$1.9 \leq |fG1/fw| \leq 3.0$, $4.0 < ft/fw < 7.0$, and $1.61 < n4 < 1.68$, where fw is an overall focal length of the zoom optical system in the wide-angle position, fG1 is a synthesized focal length of the first lens group, ft is an overall focal length of the zoom optical system in the telephoto position, and n4 is a refractive index of the fourth lens.

2. The zoom optical system of claim 1, wherein
the first lens comprises a negative refractive power and is made of plastic, and one surface thereof is aspherical, and
the second lens comprises a positive refractive power, having a meniscus shape, and made of plastic.

3. The zoom optical system of claim 1, wherein the third lens comprises a positive refractive power, is made of plastic, and an object-side surface thereof is convex;
the fourth lens is made of plastic, and
the fifth lens is made of plastic.

4. The zoom optical system of claim 1, wherein the sixth lens comprises a positive refractive power and is made of plastic.

5. The zoom optical system of claim 1, further comprising a stop disposed between the first and second lens groups.

6. The zoom optical system of claim 1, wherein an image-side surface of the first lens is concave and an object-side surface of the first lens is one of convex and concave.

7. The zoom optical system of claim 1, wherein the first to sixth lenses have an aspherical shape.

8. The zoom optical system of claim 1, wherein $1.51 < n3 < 1.57$, where n3 is a refractive index of the third lens.

9. The zoom optical system of claim 1, wherein $0.7 < |fG2/fG1| < 1.2$, where fG1 is the synthesized focal length of the first lens group, and fG2 is a synthesized focal length of the second lens group.

10. The zoom optical system of claim 1, wherein $1.4 < fG2/fw < 2.8$, where fG2 is a synthesized focal length of the second lens group, and fw is the overall focal length of the zoom optical system in the wide-angle position.

11. The zoom optical system of claim 1, wherein $TG1+TG2+TG3 < 8.5$, where TG1 is a distance from an object-side surface of the first lens to an image-side surface of the second lens, TG2 is a distance from an object-side surface of the third lens to an image-side surface of the fifth lens, TG3 is a thickness of the sixth lens at a center of an optical axis.

12. The zoom optical system of claim 1, wherein $0.25 < 1-MG3T2 < 0.6$, where MG3T is an imaging magnification of the third lens group positioned in the telephoto position at infinity.

13. The zoom optical system of claim 1, wherein $4.0 < MG2T/MG2W < 6.8$, where MG2T is an imaging magnification of the second lens group positioned in the telephoto position at infinity, and MG2W is an imaging magnification of the second lens group positioned in the wide-angle position at infinity.

14. The zoom optical system of claim 1, wherein $50 < V1 < 60$, where V1 is an Abbe number of the first lens.

15. The zoom optical system of claim 1, wherein $30 < V1-V2 < 37$, where V1 is an Abbe number of the first lens and V2 is an Abbe number of the second lens.

16. The zoom optical system of claim 1, wherein $n1+n2 < 3.25$, where n1 is a refractive index of the first lens and n2 is a refractive index of the second lens.

17. The zoom optical system of claim 1, wherein $0 < n4-n1 < 0.2$, where n1 is a refractive index of the first lens and n4 is the refractive index of the fourth lens.

18. The zoom optical system of claim 1, wherein $2.2 < fw/EPDw < 3.0$, where fw is the overall focal length of the zoom optical system in the wide-angle position and EPDw is an entrance pupil diameter in the wide-angle position.

19. A zoom optical system, comprising:
a first lens comprising a negative refractive power;
a second lens comprising a positive refractive power;
a third lens comprising a positive refractive power and a convex image-side surface;
a fourth lens comprising a negative refractive power;
a fifth lens comprising a positive refractive power; and
a sixth lens comprising a positive refractive power and an object-side surface thereof being convex,
wherein the first to sixth lenses are sequentially disposed from an object side toward an imaging plane, and
positions of the first to fifth lenses with respect to the imaging plane are adjustable.

* * * * *